(12) United States Patent
Seshita

(10) Patent No.: US 10,867,454 B2
(45) Date of Patent: Dec. 15, 2020

(54) INFORMATION PROCESSING APPARATUS AND METHOD TO CONTROL OPERATIONS IN VIRTUAL SPACE

(71) Applicant: SONY CORPORATION, Tokyo (JP)

(72) Inventor: Yusuke Seshita, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/319,371

(22) PCT Filed: Jun. 14, 2017

(86) PCT No.: PCT/JP2017/021969
§ 371 (c)(1),
(2) Date: Jan. 21, 2019

(87) PCT Pub. No.: WO2018/025511
PCT Pub. Date: Feb. 8, 2018

(65) Prior Publication Data
US 2019/0236849 A1 Aug. 1, 2019

(30) Foreign Application Priority Data

Aug. 5, 2016 (JP) .................. 2016-154517

(51) Int. Cl.
*G06T 19/20* (2011.01)
*G06T 19/00* (2011.01)
(Continued)

(52) U.S. Cl.
CPC .............. *G06T 19/20* (2013.01); *A63F 13/52* (2014.09); *G06F 3/01* (2013.01); *G06F 3/0481* (2013.01);
(Continued)

(58) Field of Classification Search
CPC ....... A63F 13/52; G06T 19/00; G06T 19/006; G06T 2219/2004; G06T 2219/2016; G06F 3/01; G06F 3/4081; G06F 3/40815
See application file for complete search history.

(56) References Cited

U.S. PATENT DOCUMENTS

2012/0162210 A1  6/2012  Cabrita
2014/0071164 A1* 3/2014  Saklatvala .............. G06F 3/005
                                                345/633
(Continued)

FOREIGN PATENT DOCUMENTS

CA    2762571 A1    6/2012
CN    102663799 A   9/2012
(Continued)

OTHER PUBLICATIONS

Stoakley, et al., "Virtual Reality on a WIM: Interactive Worlds in Miniature", CHI 95 Mosaic of Creativity, May 7-11, 1995, pp. 265-272.
(Continued)

*Primary Examiner* — Michelle L Sams
(74) *Attorney, Agent, or Firm* — Chip Law Group

(57) ABSTRACT

Provided is an information processing apparatus that includes a first space information generation unit that generates information related to a first space, a second space information generation unit that generates information related to a second space such that the second space is arranged in the first space, the second space being smaller than the first space, and an operation information processing unit that processes information regarding an operation on the first space on the basis of an operation on the second space by a user.

18 Claims, 30 Drawing Sheets

(51) Int. Cl.
*A63F 13/52* (2014.01)
*G06F 3/0481* (2013.01)
*G06F 3/01* (2006.01)

(52) U.S. Cl.
CPC .......... *G06F 3/04815* (2013.01); *G06T 19/00* (2013.01); *G06T 19/006* (2013.01); *G06T 2219/2004* (2013.01); *G06T 2219/2016* (2013.01)

(56) References Cited

U.S. PATENT DOCUMENTS

| | | | | |
|---|---|---|---|---|
| 2017/0068323 | A1* | 3/2017 | West | G06F 3/017 |
| 2018/0307397 | A1* | 10/2018 | Hastings | G06F 3/04845 |
| 2019/0188918 | A1* | 6/2019 | Brewer | G06F 3/011 |
| 2019/0236842 | A1* | 8/2019 | Bennett | G06F 3/011 |

FOREIGN PATENT DOCUMENTS

| | | |
|---|---|---|
| EP | 2469474 A1 | 6/2012 |
| JP | 2001-300131 A | 10/2001 |
| JP | 2011-186536 A | 9/2011 |
| JP | 2012-138087 A | 7/2012 |

OTHER PUBLICATIONS

International Search Report and Written Opinion of PCT Application No. PCT/JP2017/021969, dated Aug. 22, 2017, 09 pages of ISRWO.

Stoakley, et al., "Virtual Reality on a WIM:Interactive Worlds in Miniature", CHI '95 Mosaic of Creativity, May 9-11, 1995, 265-272 pages.

Stoakley, et al., "Virtual Reality on a WIM: Interactive Worlds in Miniature", CHI '95 Mosaic of Creativity, May 7-11, 1995.

* cited by examiner

FIG. 4
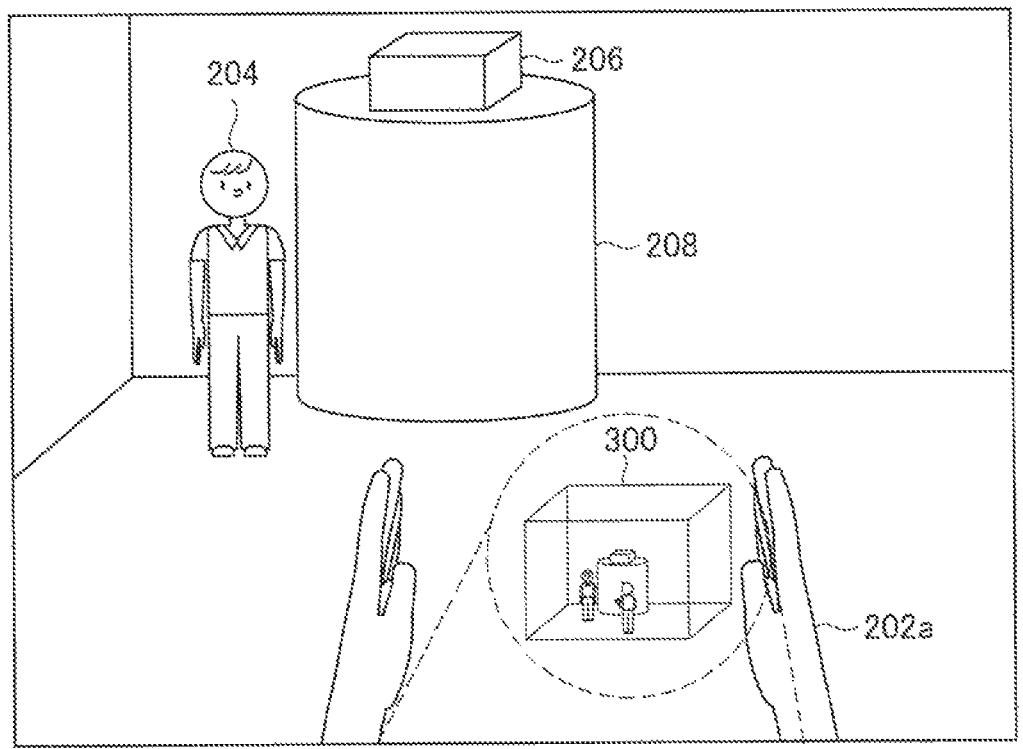
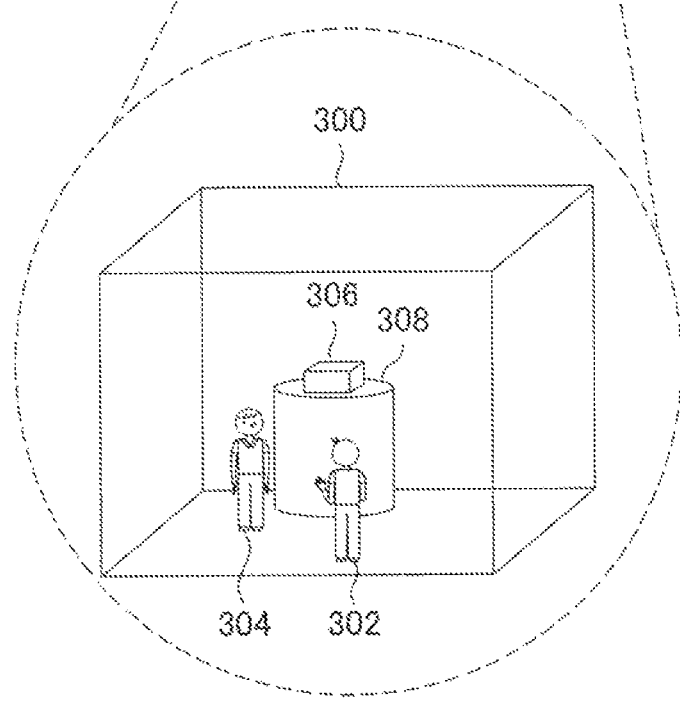

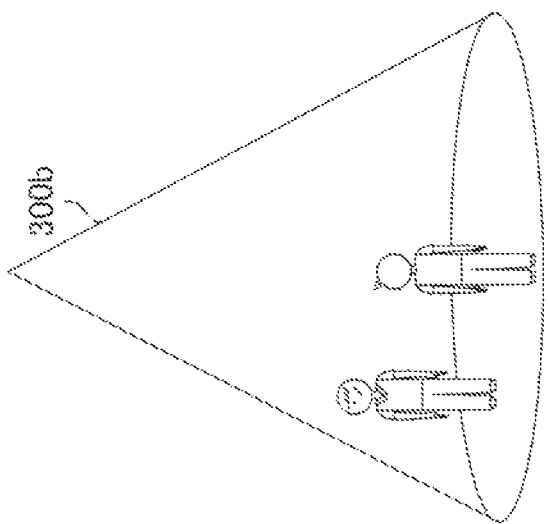
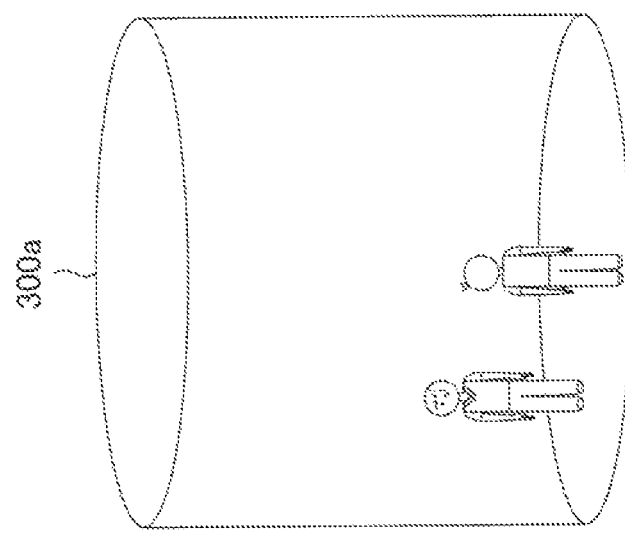
FIG. 5

FIG. 17
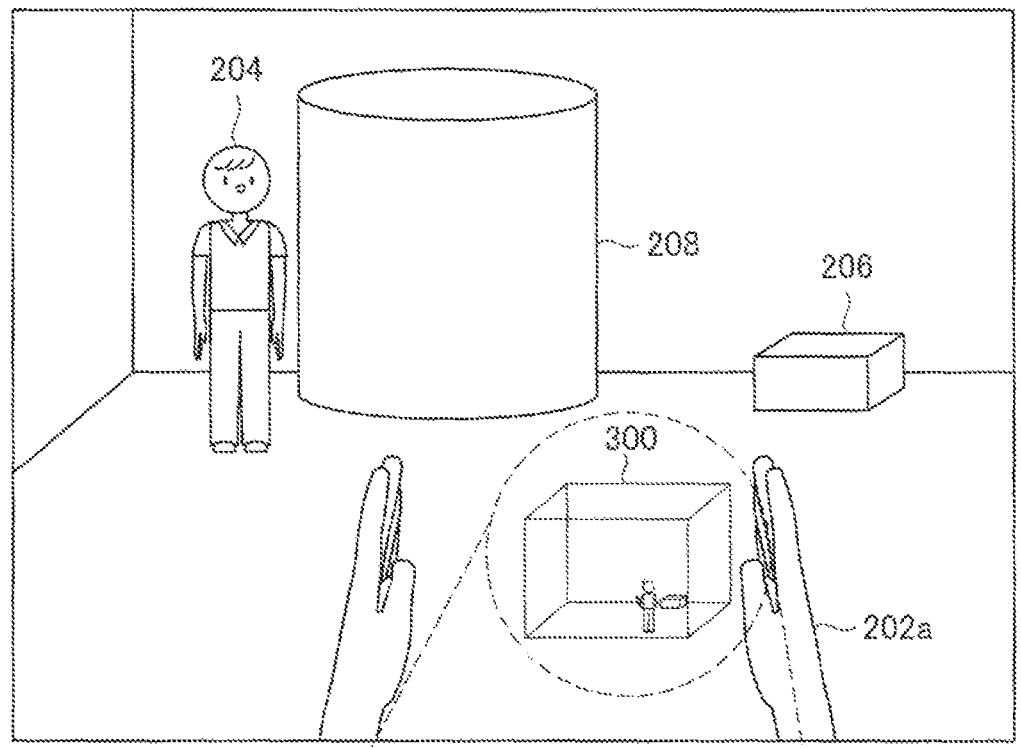
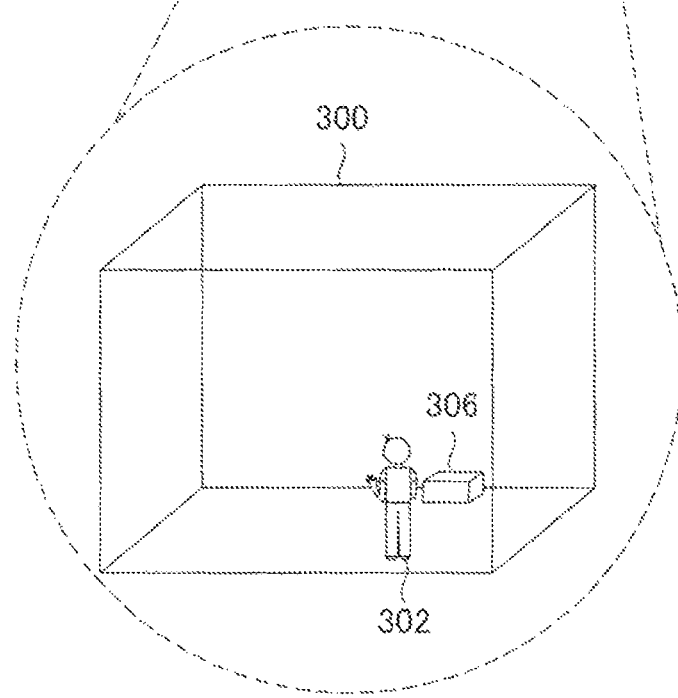

INFORMATION PROCESSING APPARATUS AND METHOD TO CONTROL OPERATIONS IN VIRTUAL SPACE

CROSS REFERENCE TO RELATED APPLICATIONS

This application is a U.S. National Phase of International Patent Application No. PCT/JP2017/021969 filed on Jun. 14, 2017, which claims priority benefit of Japanese Patent Application No. JP 2016-154517 filed in the Japan Patent Office on Aug. 5, 2016. Each of the above-referenced applications is hereby incorporated herein by reference in its entirety.

TECHNICAL FIELD

The present disclosure relates to an information processing apparatus, a method, and a computer program.

BACKGROUND ART

An information processing apparatus that executes games or the like using a virtual space is developed nowadays. The user is able to perform an operation on a virtual space or an operation on a virtual object in the virtual space by performing a predetermined operation, thereby enjoying a game or the like using the virtual space.

Patent Literature 1 discloses an information processing apparatus that executes predetermined processing on a virtual object in an augmented reality space that is the virtual space based on the real space. Patent Literature 1 discloses the arrangement of the virtual object in the virtual space, in one example, by a user operating the main body of the information processing apparatus.

CITATION LIST

Patent Literature

Patent Literature 1: JP 2011-186536A

DISCLOSURE OF INVENTION

Technical Problem

The information processing apparatus disclosed in Patent Literature 1 described above allows the user's operation on the virtual space to be performed using the main body of the information processing apparatus. However, the operation on the virtual space is variously different, so the technique disclosed in Patent Literature 1 will increase complexity of the operation on the virtual space by the user. In view of this, the present disclosure provides an information processing apparatus, method, and computer program, enabling a user to easily perform various operations on the virtual space.

Solution to Problem

According to the present disclosure, there is provided an information processing apparatus including: a first space information generation unit configured to generate information related to a first space; a second space information generation unit configured to generate information related to a second space such that the second space is arranged in the first space, the second space being smaller than the first space; and an operation information processing unit configured to process information regarding an operation on the first space on the basis of an operation on the second space by a user.

In addition, according to the present disclosure, there is provided a method including: generating, by a first space information generation unit, information related to a first space; generating, by a second space information generation unit, information related to a second space such that the second space is arranged in the first space, the second space being smaller than the first space; and processing, by an operation information processing unit, information regarding an operation on the first space by allowing a user to perform an operation on the second space. The second space is arranged in the first space.

In addition, according to the present disclosure, there is provided a computer program for causing a first space information generation unit to generate information related to a first space, causing a second space information generation unit to generate information related to a second space such that the second space is arranged in the first space, the second space being smaller than the first space, and causing an operation information processing unit to process information regarding an operation on the first space on the basis of an operation on the second space by a user.

Advantageous Effects of Invention

According to the present disclosure as described above, the user is able to perform easily various operations on the virtual space.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 4 is a diagram illustrating an example of a virtual space and a small space arranged in the virtual space according to an embodiment of the present disclosure.

FIG. 5 is a diagram illustrating an example of the form of a small space arranged in a virtual space according to an embodiment of the present disclosure.

FIG. 17 is a diagram illustrating an example of a method of displaying a pseudo virtual object in a small space according to an embodiment of the present disclosure.

MODE(S) FOR CARRYING OUT THE INVENTION

Figure 1:
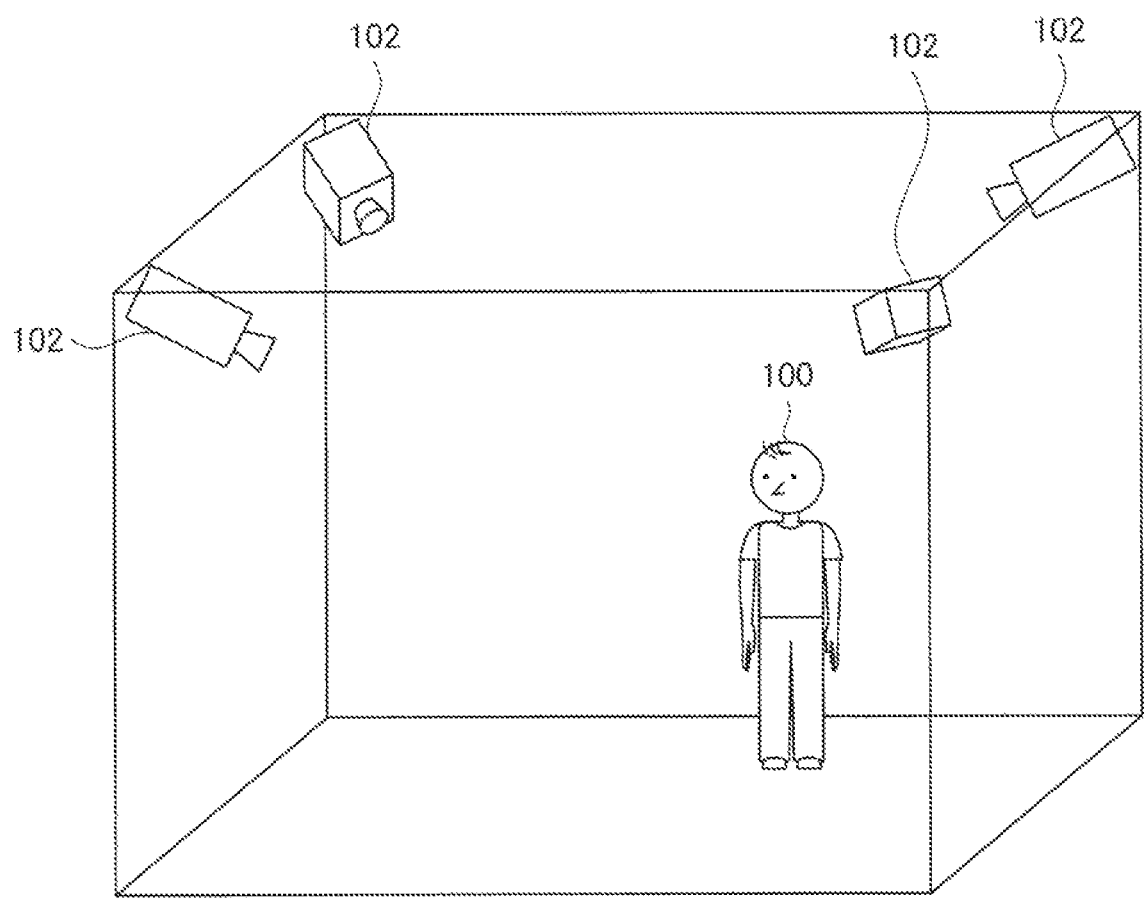
FIG. 1 is a diagram illustrating an example of a user information detector that detects a user's position, motion, or the like, according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Moreover, the description will be given in the following order.
1. Configuration of information processing apparatus
2. Configuration of virtual space and small space
3. Method of operation using small space
3-1. Movement of virtual object
3-2. Drawing pseudo virtual object out of small space
3-3. Operation on user virtual object
3-4. Drawing pseudo user virtual object out of small space
4. Processing example of operation using small space in virtual space
5. Other methods of operation using small space
6. Method of displaying pseudo virtual object in small space
7. Method of operation on small space
7-1. Method of operation of changing size of small space
7-2. Operation of changing scale in small space and scroll operation in small space
8. Method of operation using small space for shifting to virtual space in different modes
9. Method of operation using small space in virtual space having plural hierarchies
10. Method of operation for deleting and displaying small space
11. Example of application to augmented reality space (AR space)
12. Supplement
13. Concluding remarks

1. Configuration of Information Processing Apparatus

An information processing apparatus according to an embodiment of the present disclosure is described with reference to FIGS. 1 and 2. The information processing apparatus provided in the present disclosure includes a user information detector 102 that detects a user 100. In addition, the information processing apparatus provided in the present disclosure arranges a virtual object of the user 100 in a virtual space on the basis of information related to the user 100 detected by the user information detector 102. In addition, the information processing apparatus provided in the present disclosure processes an operation of the user 100 on the virtual space on the basis of the information related to the user 100 detected by the user information detector 102. Moreover, the technology provided in the present disclosure is preferably applicable to an information processing apparatus using the virtual space, such as game consoles. In addition, the information processing apparatus is preferably a general-purpose computer or a portable terminal having communication means such as smartphones. In addition, the virtual space is an example of a first space including a virtual object that is an example of a first object.

FIG. 1 is a diagram illustrating an example of the user information detector 102 used in the information processing apparatus. In FIG. 1, the user information detector 102 is an imaging device, and in one example, four user information detectors 102 are installed to acquire information related to the user 100, such as the motion, shape, and position of the user 100. In addition, the user information detector 102 is preferably, in one example, an imaging device that captures the entire circumference, and in this case, one imaging device can be used. Moreover, the user information detector 102 can be any device that acquires the information related to the user 100, and is not limited to an imaging device. In one example, the user information detector 102 can be a device that irradiates the user 100 with light such as infrared rays and acquires the information related to the user 100 by detecting the reflected light.

Figure 2:
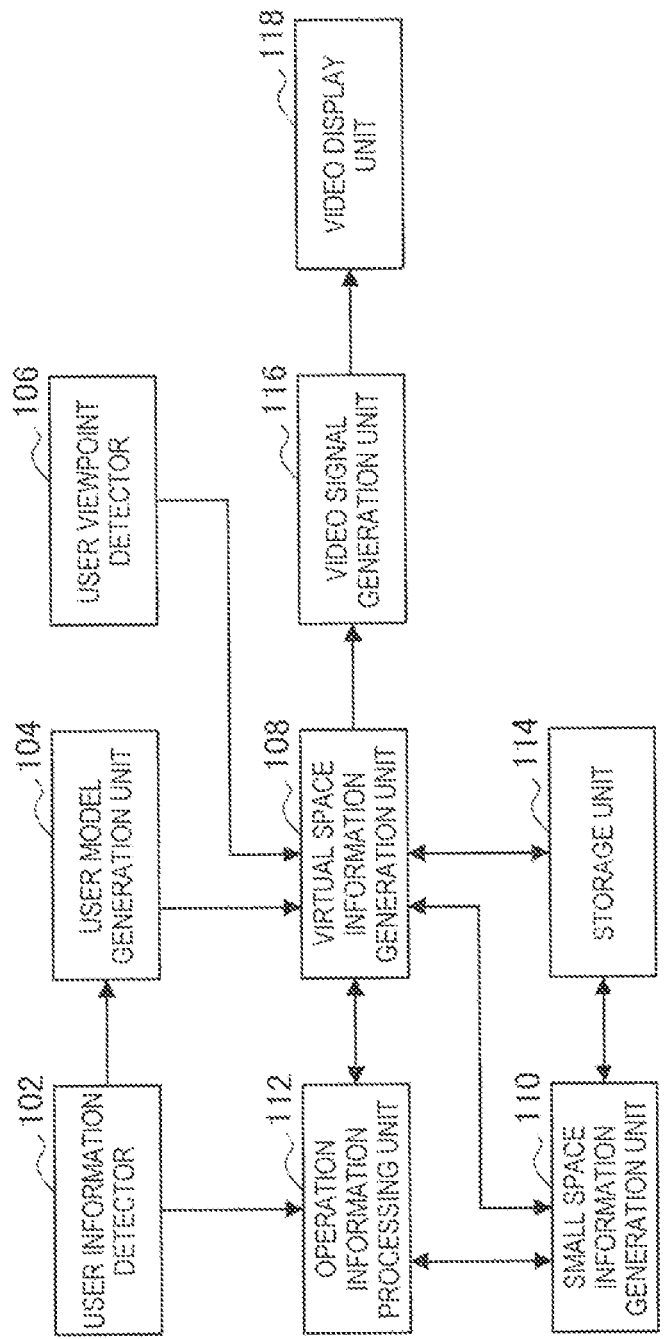
FIG. 2 is a block diagram illustrating an exemplary configuration of an information processing apparatus according to an embodiment of the present disclosure.

FIG. 2 is a block diagram illustrating the configuration of the information processing apparatus provided in the present disclosure. The information processing apparatus provided in the present disclosure further includes a user model generation unit 104, a user viewpoint detector 106, a virtual space information generation unit 108, a small space information generation unit 110, an operation information processing unit 112, a storage unit 114.

The user model generation unit 104 generates a user virtual object to be arranged in the virtual space on the basis of the information related to the user 100 acquired by the user information detector 102. The user virtual object generated by the user model generation unit 104 can be a form imitating the form of the user 100 in the real space or can have a different form from the user 100 in the real space. In one example, the user model generation unit 104 can generate a user virtual object having different clothes from the user 100 in the real space.

The user viewpoint detector 106 detects a direction in which the user 100 is facing. In one example, the user viewpoint detector 106 can be a device to be worn on the head of the user 100 (e.g., a device like headgear). In this case, the user viewpoint detector 106 can be provided with an image sensor, and the viewpoint of the user 100 can be detected on the basis of an image captured by the image sensor. In addition, the user viewpoint detector 106 can be provided with a gyro-sensor and/or an acceleration sensor, and the viewpoint of the user 100 can be detected on the basis of the angular velocity, angular acceleration, and acceleration detected by such a sensor. In addition, the user information detector 102 described above can include the function of the user viewpoint detector 106. In the case where the user information detector 102 is an imaging device, the viewpoint of the user 100 can be detected by allowing the imaging device to detect the eye of the user 100.

The virtual space information generation unit 108 generates information related to the virtual space on the basis of information or the like stored in the storage unit 114. The virtual space-related information generated by the virtual space information generation unit 108 includes information related to the virtual object arranged in the virtual space. In addition, the virtual space information generation unit 108 arranges the user virtual object generated by the user model generation unit 104 in the virtual space. Moreover, the user virtual object is an example of the virtual object and is included in the virtual object. Moreover, the virtual space information generation unit 108 is an example of a first space information generation unit that generates information related to the virtual space that is an example of the first space.

The small space information generation unit 110 generates information related to a small space to be described later, which is arranged in the virtual space. The small space can be a space obtained by copying at least a portion of the virtual space, and in this case, the small space information generation unit 110 receives the information related to the virtual space from the virtual space information generation unit 108. Then, the small space information generation unit 110 generates information related to the small space on the basis of the information received from the virtual space information generation unit 108. In addition, the small space information generation unit 110 sends the information related to the generated small space to the virtual space information generation unit 108, and the virtual space information generation unit 108 arranges the small space in the virtual space on the basis of the information. Moreover, the small space information generation unit 110 is an example of a second space information generation unit that generates information related to the small space that is an example of the second space.

As described above, in a case where the small space is obtained by copying at least a portion of the virtual space, the virtual space information generation unit 108 and the small space information generation unit 110 exchange information with each other. In addition, the small space information generation unit 110 can generate the information related to the small space on the basis of the information stored in the storage unit 114 without copying the virtual space. In addition, the small space information generation unit 110 can generate the information related to the small space on the basis of the information from the virtual space information generation unit 108 and the information stored in the storage unit 114.

The operation information processing unit 112 processes information related to an operation on the virtual space on the basis of the operation of the user 100 on the small space. The operation information processing unit 112 recognizes that the user 100 is operating the small space on the basis of the information related to motion of the user 100 from the user information detector 102. Then, the operation information processing unit 112 processes the information related to an operation on the virtual space on the basis of the recognized operation of the user 100 on the small space. The virtual space information generation unit 108 generates information related to the virtual space on the basis of the operation information processed by the operation information processing unit 112.

Moreover, in FIG. 1, the user information detector 102 is shown as an imaging device. However, the user information detector 102 can be an operation device that is operated with the hand of the user 100, or can be an operation device configured to be worn on the hand of the user 100. The operation information processing unit 112 can process the operation information on the basis of the information from the user information detector 102 configured as described above.

The information processing apparatus provided in the present disclosure further includes a video signal generation unit 116 and a video display unit 118. The video signal generation unit 116 generates a video signal on the basis of the virtual space-related information generated by the virtual space information generation unit 108. Here, the virtual space-related information generated by the virtual space information generation unit 108 includes the small space-related information generated by the small space information generation unit 110.

The video display unit 118 displays a video image of the virtual space on the basis of the video signal generated by the video signal generation unit 116. The video display unit 118 can be, in one example, a typical monitor, or can be a display device attached to the user 100, like head-mounted displays, which gives a sense of immersion in the virtual space to the user 100. In addition, the video display unit 118 can be provided with a liquid crystal display or can be provided with an organic EL (Electro Luminescence) display.

2. Configuration of Virtual Space and Small Space

The above description is given of the configuration of the information processing apparatus provided in the present disclosure. The following description is given of the configuration of the virtual space and the small space arranged in the virtual space, which are displayed in the information processing apparatus provided in the present disclosure. The small space is used for the operation of the user 100, as described later.

Figure 3:
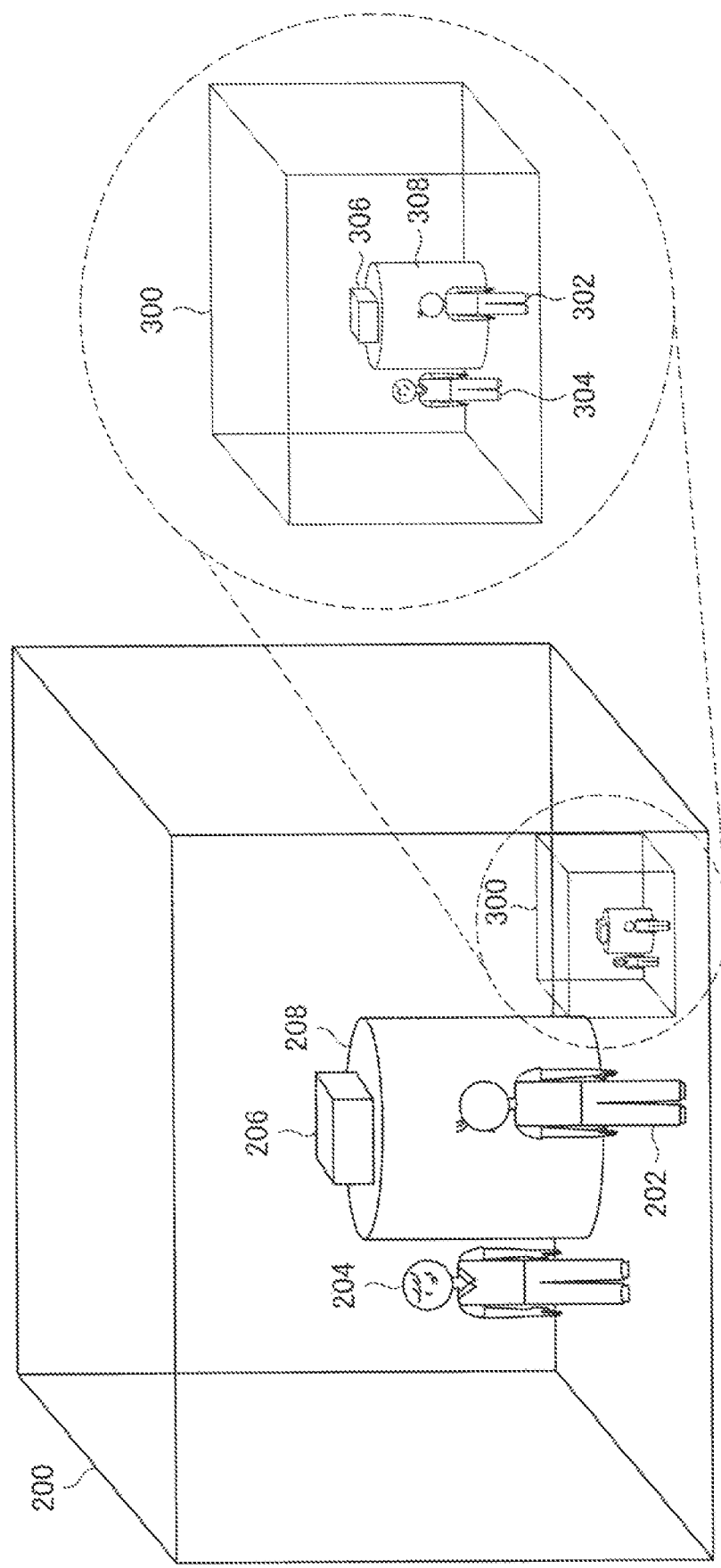
FIG. 3 is a diagram illustrating an example of a virtual space and a small space arranged in the virtual space according to an embodiment of the present disclosure.

FIG. 3 is a diagram illustrating the configuration of a virtual space 200 based on the information generated by the virtual space information generation unit 108. The virtual space 200 includes, in one example, a virtual object. Examples of the virtual object include a virtual object 202 indicating the user 100 (hereinafter also referred to as a user virtual object), a virtual object 204 indicating a person different from the user 100 (hereinafter also referred to as an other person virtual object), and virtual objects 206 and 208 indicating things (hereinafter also referred to as a thing virtual object). The user virtual object 202 is a virtual object operated by the user 100. This operation is performed on the basis of motion or the like of the user 100 detected by the user information detector 102.

Further, the virtual space 200 has a small space 300, which is arranged in the virtual space 200, based on the information generated by the small space information generation unit 110. In one example, the small space 300 can be configured to be obtained by completely copying the configuration of the virtual space 200, by copying only a part of the configuration of the virtual space 200, or by including a configuration different from that of the virtual space 200. This allows the small space 300 to include a pseudo virtual object corresponding to the virtual object in the virtual space 200. Moreover, a view surrounded by a dotted circle in FIG. 3 is a view showing by enlarging the small space 300 arranged in the virtual space 200. Moreover, the pseudo virtual object is an example of a second object included in the small space 300 that is an example of the second space.

FIG. 3 illustrates an example in which the configuration of the virtual space 200 and the configuration of the small space 300 are substantially the same. In FIG. 3, the small space 300 includes therein a pseudo user virtual object 302 corresponding to the user virtual object 202 and a pseudo other person virtual object 304 corresponding to the other person virtual object 204. In addition, the small space 300 includes therein pseudo thing virtual objects 306 and 308 respectively corresponding to the thing virtual objects 206 and 208.

Moreover, in FIG. 3, the pseudo virtual objects in the small space 300 are displayed in a positional relationship similar to that between the virtual objects in the virtual space 200. However, the small space 300 can be configured such that a specific pseudo virtual object like the pseudo user virtual object 302 is displayed in the center of the small space 300. Such configuration of the small space 300 makes it possible for the user 100 to recognize more intuitively the positional relationship with a specific virtual object in the virtual space 200.

Further, the small space 300 can be configured to be different in scale (scale ratio) from the virtual space 200. In other words, the scale in the small space 300 can be equal to the scale in the virtual space 200, or can be larger or smaller than the scale in the virtual space 200. FIG. 3 illustrates an example in which the scale in the small space 300 is smaller than the scale in the virtual space 200. Thus, the pseudo virtual object in the small space 300 is displayed smaller than the virtual object in the virtual space 200.

Moreover, the small space 300 can be configured to perform display for distinguishing the small space 300 from the periphery of the small space 300 to indicate the boundary of the small space 300. In one example, the small space 300 can be configured such that the whole or a part of the periphery of the small space 300 varies periodically. In addition, the small space 300 can be displayed in a manner that a shining ring moves from one end to the other end of a side of the outer frame of the small space 300 (e.g., from the upper end to the lower end, or from the left end to the right end) periodically. Alternately, the small space 300 can be displayed in a manner that the whole of the small space 300 shines periodically. In addition, the periphery of the small space 300 can be indicated in a manner that texture thereof varies. In other words, the small space 300 can be displayed translucently, can be displayed in the form of polygons, can be displayed in the form of wire frame, or can be displayed with increased luminance.

FIG. 3 illustrates an example in which the virtual space 200 is displayed as an elevated view of the virtual space 200 from above. However, the virtual space 200 can be displayed across the user's viewpoint. FIG. 4 is a diagram illustrating an example of the virtual space 200 displayed across the user's viewpoint. In FIG. 4, an arm portion 202a of the user virtual object 202 is displayed instead of the entire image of the user virtual object 202. However, as illustrated in FIG. 4, in this event, the entire pseudo user virtual object 302 corresponding to the user virtual object 202 in the virtual space 200 can be displayed in the small space 300. Moreover, a view surrounded by a dotted circle in FIG. 4 is a view showing by enlarging the small space 300 arranged in the virtual space 200.

Figure 6:
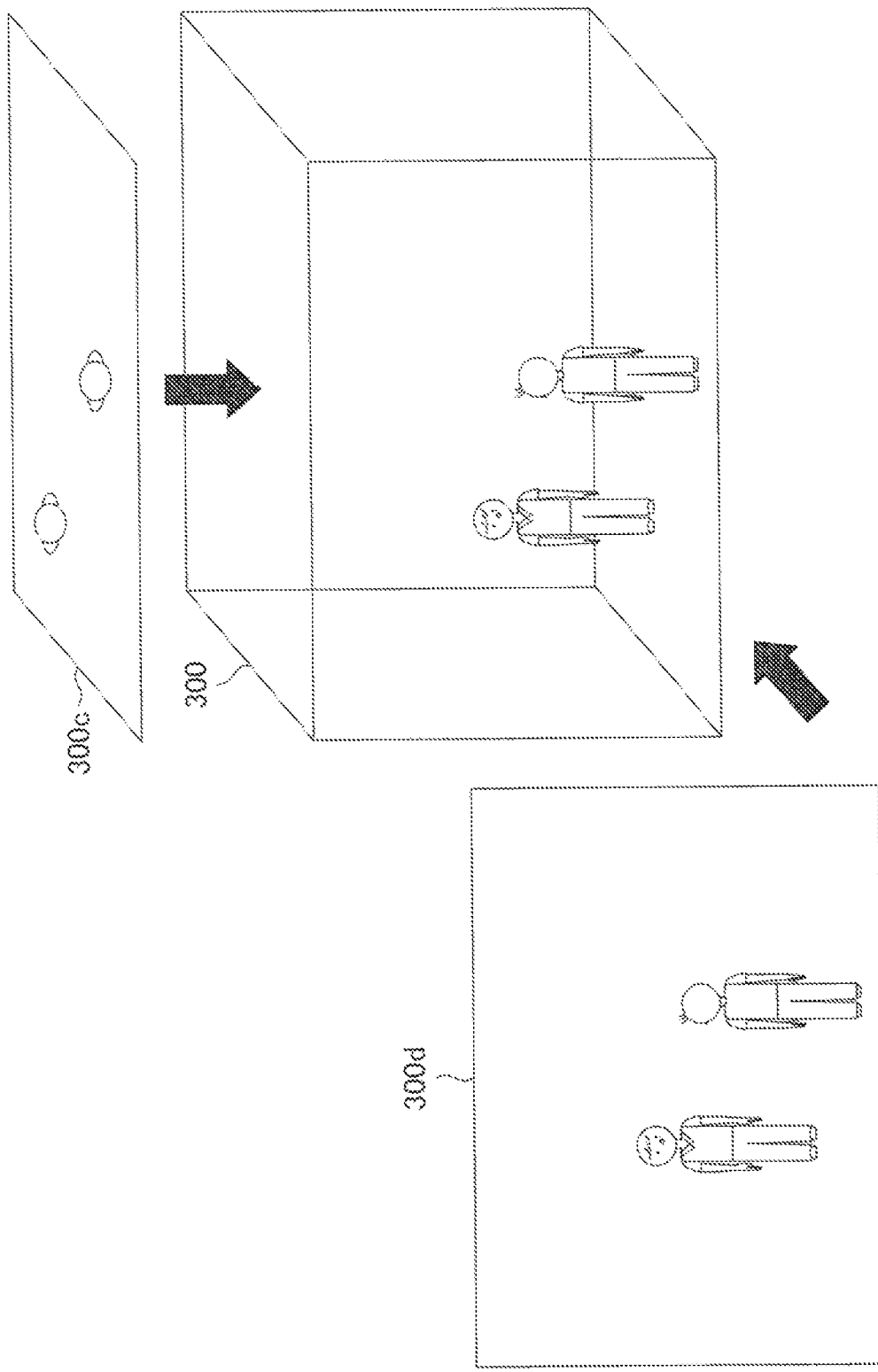
FIG. 6 is a diagram illustrating an example of the form of a small space arranged in a virtual space according to an embodiment of the present disclosure.

FIG. 5 is a diagram illustrating another example of a mode in which the small space 300 is displayed. In FIGS. 3 and 4, the small space 300 is a cube, but the small space 300 can be a cylindrical small space 300a or a triangular pyramidal small space 300b as illustrated in FIG. 5. In other words, the shape of the small space 300 can be any shape. In addition, in FIGS. 3 to 5, the small space 300 is three-dimensional, but as illustrated in FIG. 6, the small space 300 can be displayed as a two-dimensional plane 300c in which the small space 300 is projected from the upper surface or a two-dimensional plane 300d in which the small space 300 is projected from the side face. The small space 300 can be represented in a one-dimensional form.

3. Method of Operation Using Small Space

<3-1. Movement of Virtual Object>

Figure 7:
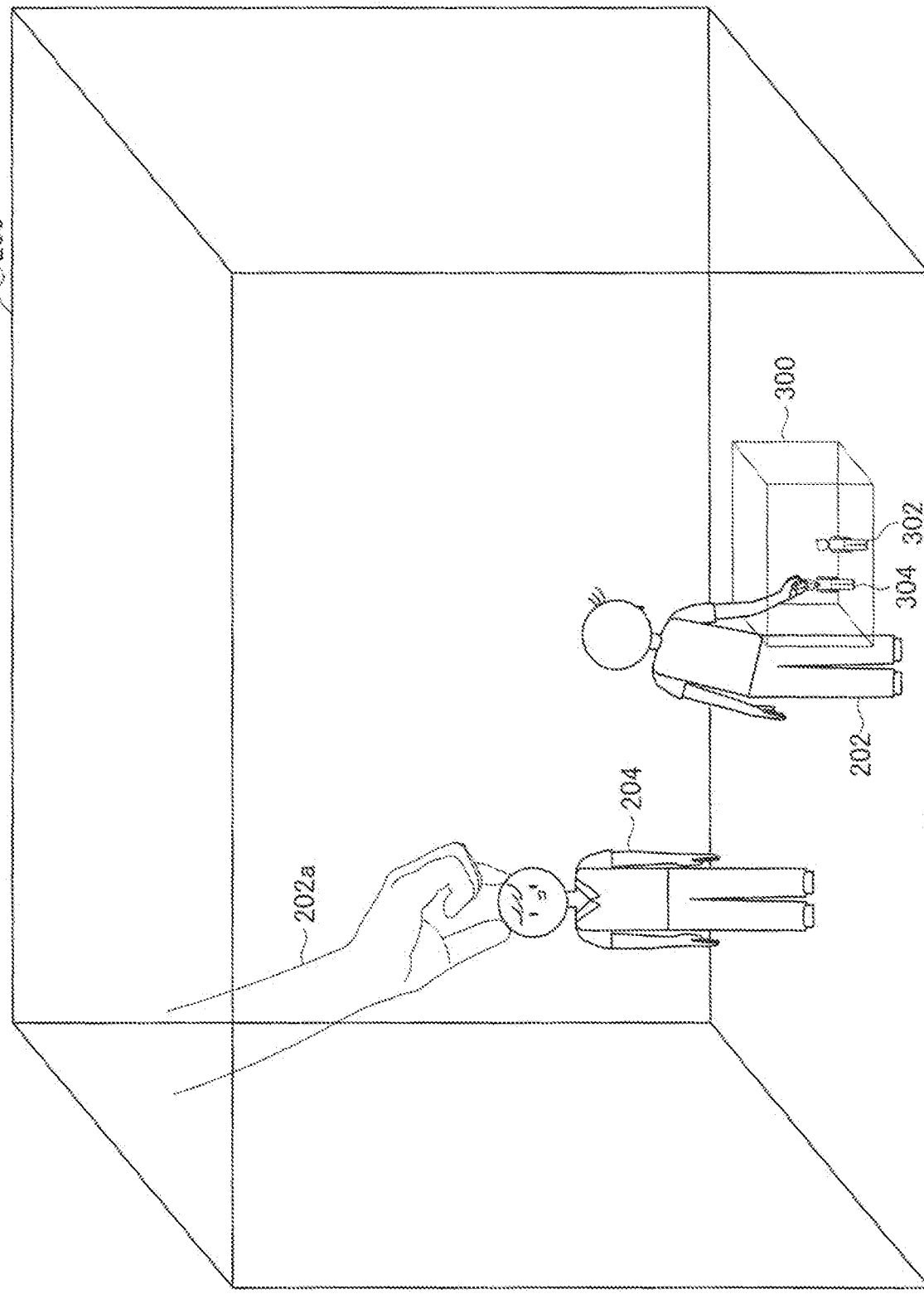
FIG. 7 is a diagram illustrating an example of an operation performed on an object in a virtual space by a user using a small space according to an embodiment of the present disclosure.
Figure 8:
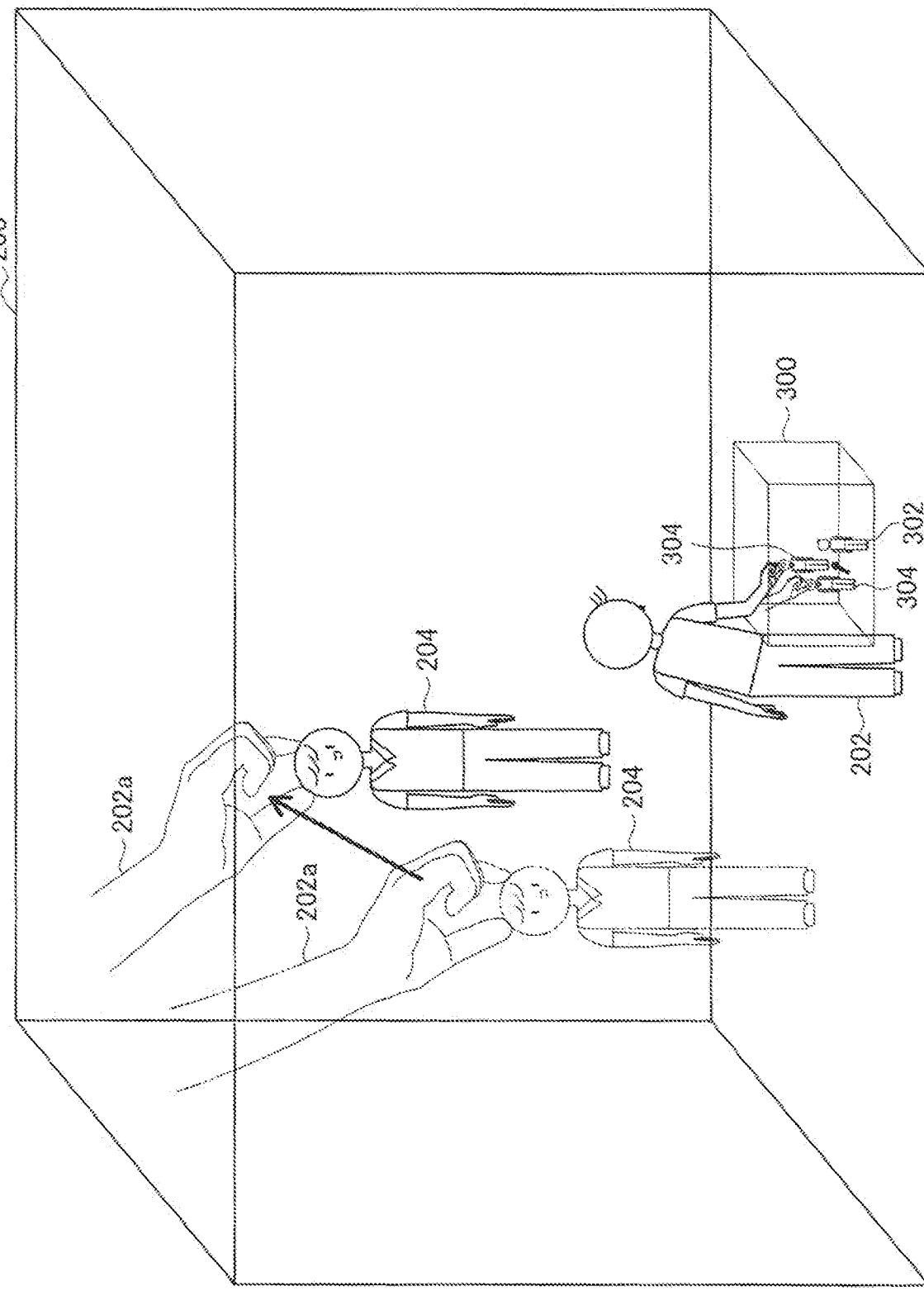
FIG. 8 is a diagram illustrating an example of an operation performed on a virtual object in a virtual space by a user using a small space according to an embodiment of the present disclosure.

The above description is given of the configuration of the virtual space 200 and the small space 300 displayed in the information processing apparatus provided in the present disclosure. The following description is given of various examples of an operation on the virtual space 200 performed by the user 100 using the small space 300. The method of operation described below is useful, in one example, in performing an operation by the user 100 in a game using the augmented virtual space 200. FIGS. 7 and 8 are diagrams illustrating a process of moving the virtual object in the virtual space 200 by the user 100 performing an operation of moving the pseudo virtual object of the small space 300 within the small space 300.

The user virtual object 202 is moved in the virtual space 200 by movement of the user 100 in the real space or by operating any operation device. As illustrated in FIG. 7, when the arm of the user virtual object 202 goes into the small space 300 by the operation of the user 100, a portion 202a corresponding to the arm of the user virtual object 202 that goes into the small space 300 is displayed at a corresponding position in the virtual space 200.

As illustrated in FIG. 8, the pseudo other person virtual object 304 in the small space 300 is operated by the operation of the user 100. Here, the user 100 performs an operation so that the virtual user object 202 grasps the pseudo other person virtual object 304 in the small space 300 and moves the pseudo other person virtual object 304. Then, when the pseudo other person virtual object 304 is operated, the user virtual object 202 in the virtual space 200 moves as illustrated in FIG. 8 in response to movement of the pseudo other person virtual object 304 in the small space 300. In FIG. 8, the user virtual object 202 before the movement is indicated by two-dot chain line, and the user virtual object 202 after the movement is indicated by solid line.

The method of an operation using the small space 300 as described above makes it possible for the user 100 to operate easily a virtual object that is far from the user virtual object 202 in the virtual space 200. Moreover, the above description is given of the example in which the portion 202a corresponding to the arm of the user virtual object 202 that goes into the small space 300 is displayed in the virtual space 200. However, the portion 202a corresponding to the arm of the user virtual object 202 that goes into the small space 300 is not necessarily displayed.

<3-2. Drawing Pseudo Virtual Object Out of Small Space>

The above description is given of the method of operation of moving a virtual object in the virtual space 200 by allowing the user 100 to perform the operation of moving the pseudo virtual object in the small space 300. The following description is given of a method of operation of moving a virtual object in the virtual space 200 by allowing the user 100 to perform an operation of drawing the pseudo virtual object in the small space 300 out of the small space 300.

Figure 9:
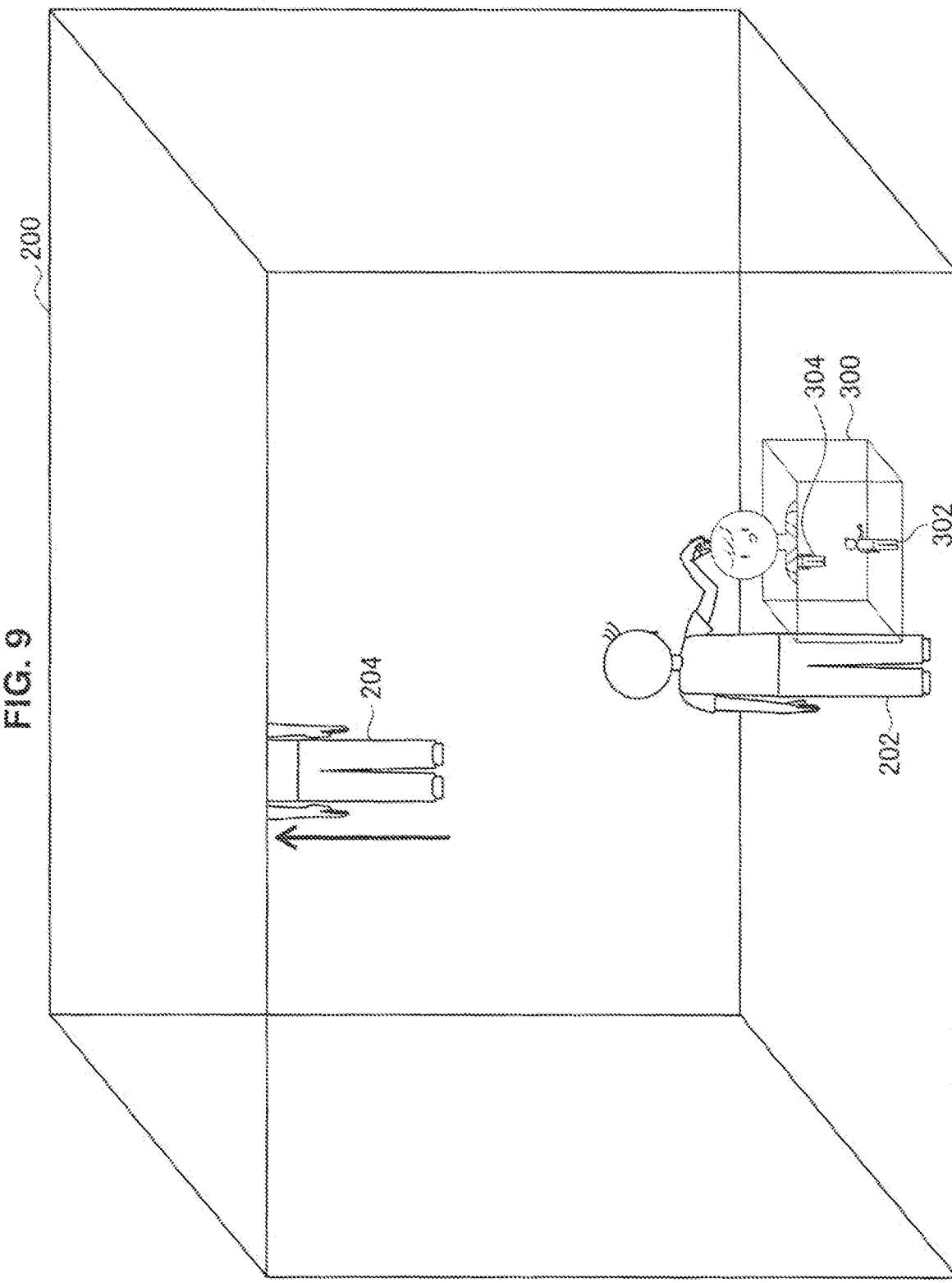
FIG. 9 is a diagram illustrating an example of an operation performed on a virtual object in a virtual space by a user using a small space according to an embodiment of the present disclosure.

As illustrated in FIG. 9, when the pseudo other person virtual object 304 in the small space 300 is moved upward by the operation of the user 100, the other person virtual object 204 in the virtual space 200 moves upward in the virtual space 200 in response to the movement of the pseudo other person virtual object 304. Then, when a portion of the pseudo other person virtual object 304 is drawn out of the small space 300, the portion (the upper half of the body in FIG. 9) of the pseudo other person virtual object 304 drawn out of the small space 300 is displayed in an enlarged form in conformity with the scale of the virtual space 200. In addition, in this event, a portion of the other person virtual object 204 corresponding to the portion (the upper half of the body in FIG. 9) of the pseudo other person virtual object 304 drawn out of the small space 300 is not displayed.

Figure 10:
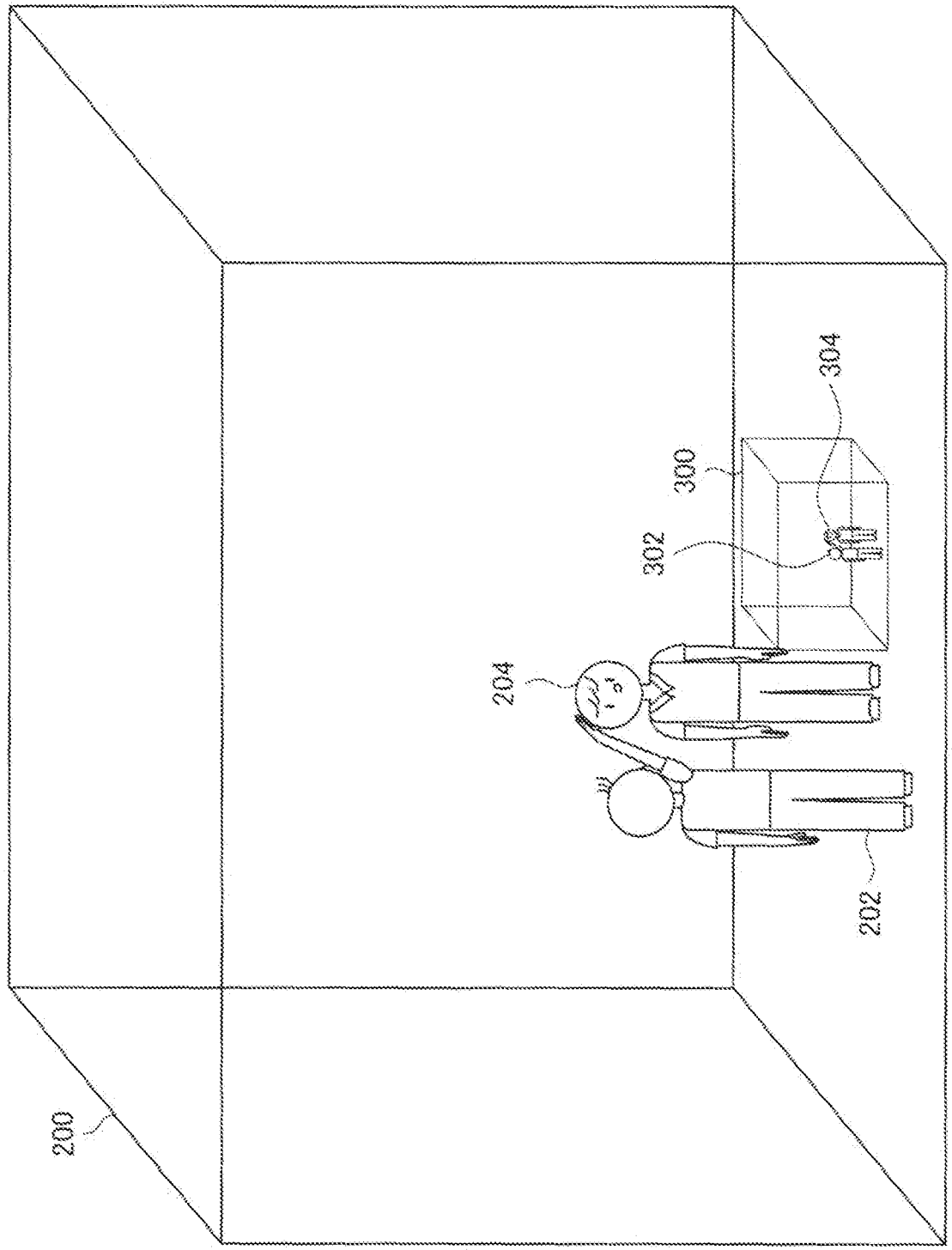
FIG. 10 is a diagram illustrating an example of an operation performed on a virtual object in a virtual space by a user using a small space according to an embodiment of the present disclosure.

FIG. 10 is a diagram illustrating a state in which the pseudo other person virtual object 304 is completely drawn out of the small space 300 by the operation of the user 100 after the state illustrated in FIG. 9. As illustrated in FIG. 10, the pseudo other person virtual object 304 completely drawn out of the small space 300 is converted into the other person virtual object 204, and is arranged in the virtual space 200. Such an operation method makes it possible for the user 100 to move easily a virtual object that is far from the user virtual object 202 in the virtual space 200 to the vicinity of the user virtual object 202.

<3-3. Operation on User Virtual Object>

Figure 11:
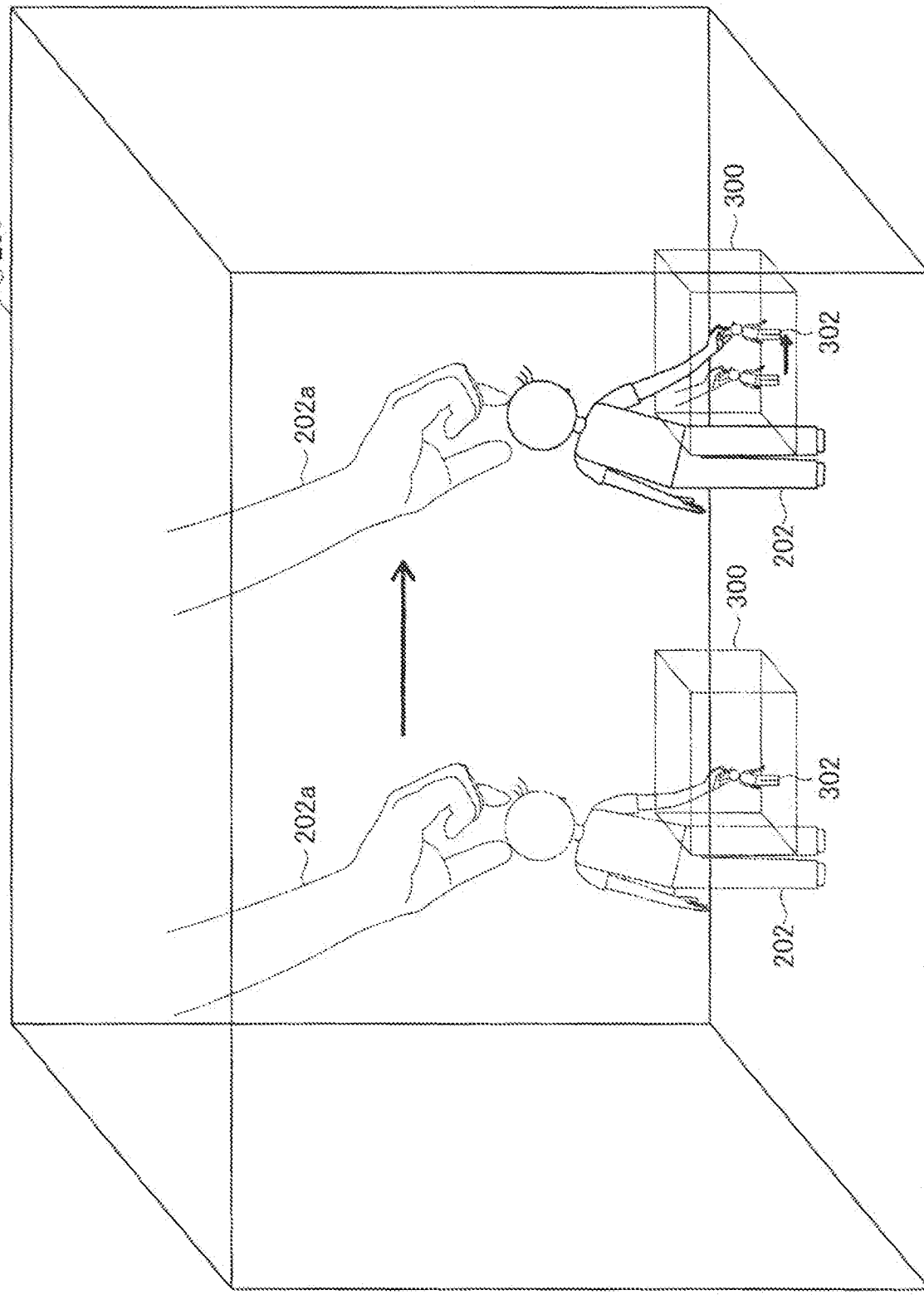
FIG. 11 is a diagram illustrating an example of an operation performed on a virtual object in a virtual space by a user using a small space according to an embodiment of the present disclosure.

The above description is given of the method of the operation of moving the virtual object in the virtual space 200 by allowing the user 100 to perform an operation of drawing the pseudo virtual object in the small space 300 out of the small space 300. The following description is given of a method of operation on the user virtual object 202. As described above, the user virtual object 202 in the virtual space 200 is a virtual object representing the user 100 and can have a different property from other virtual objects. FIG. 11 is a diagram illustrating a method of an operation of moving the pseudo user virtual object 302 in the small space 300 and accordingly of moving the user virtual object 202 in the virtual space 200.

Similar to the operation method described above, when the user 100 moves the pseudo user virtual object 302 in the small space 300, accordingly the user virtual object 202 in the virtual space 200 also moves. However, in this event, when the small space 300 does not move along with the user virtual object 202, the relative positional relationship between the hand of the user virtual object 202 and the small space 300 will change as the user virtual object 202 moves. If the relative positional relationship between the hand of the user virtual object 202 and the small space 300 is changed, it is certain that the user 100 fails to perform an operation using the small space 300.

To solve this problem, as illustrated in FIG. 11, in the case where the user virtual object 202 moves, the small space 300 also moves along with the user virtual object 202 in response to the movement of the user virtual object 202. Such an operation method makes it possible for the user 100 to move easily the user virtual object 202 to a remote place in the virtual space 200. In addition, even in the case where the user virtual object 202 moves, the user 100 is able to perform continuously the operation using the small space 300. Moreover, in FIG. 11, the user virtual object 202 before the movement is indicated by two-dot chain line, and the user virtual object 202 after the movement is indicated by solid line.

Further, to solve the above-described problem, the configuration in which the operation is confirmed when the user 100 performs the processing of confirming the operation without immediately considering the operation on the pseudo user virtual object 302 in the small space 300 can be possible. In one example, the confirmation of the operation can be performed by allowing the user 100 to grasp and move the pseudo user virtual object 302 and then to release the pseudo user virtual object 302.

<3-4. Drawing Pseudo User Virtual Object Out of Small Space>

The above description is given of the method of the operation of moving the pseudo user virtual object 302 into the small space 300. The following description is given of a method of an operation in which the pseudo user virtual object 302 is drawn out of the small space 300 with reference to FIG. 12. Similar to the operation method described above, when the pseudo user virtual object 302 in the small space 300 is drawn upward, accordingly the user virtual object 202 in the virtual space 200 also moves upward.

Figure 12:
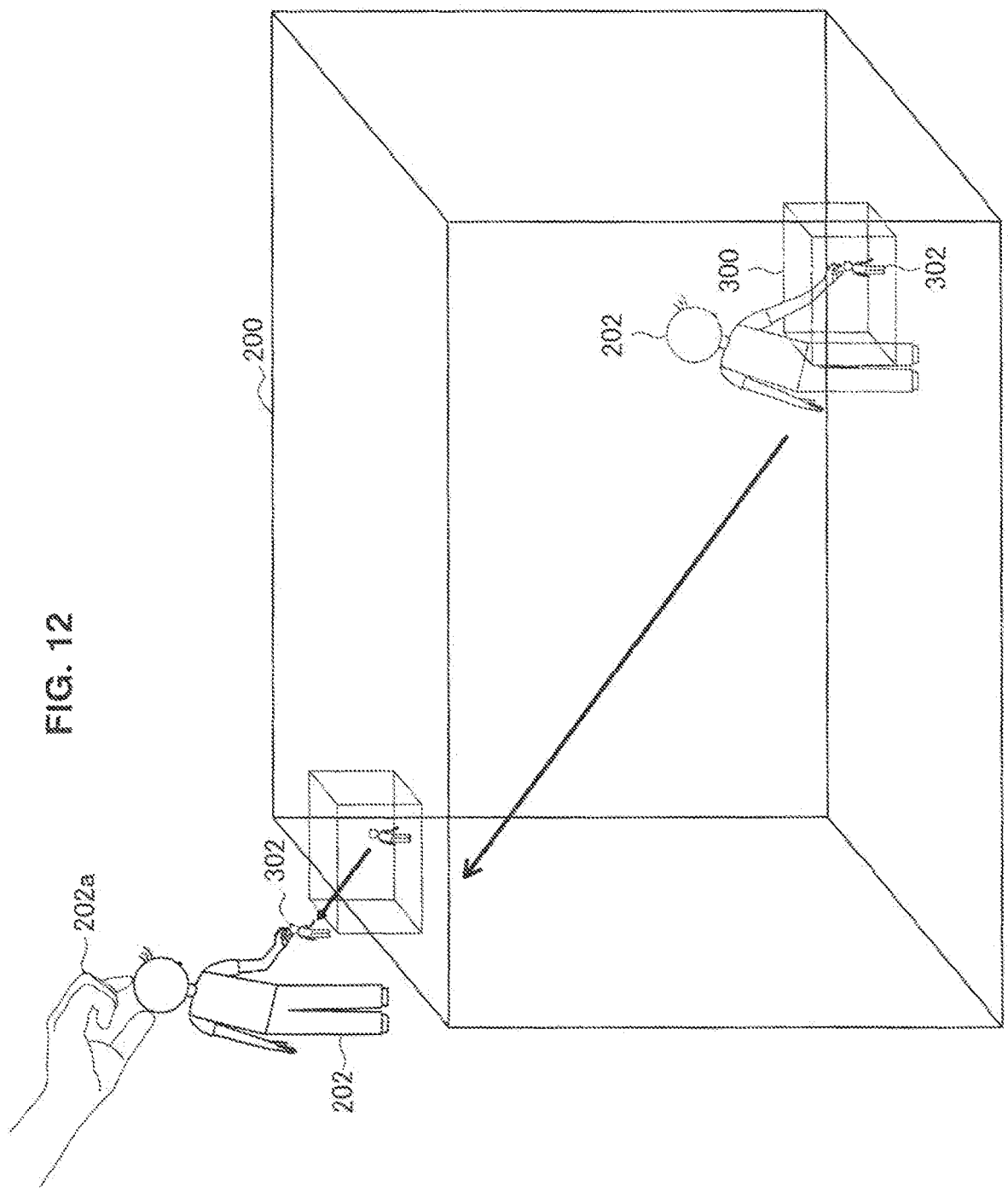
FIG. 12 is a diagram illustrating an example of an operation performed on a virtual object in a virtual space by a user using a small space according to an embodiment of the present disclosure.

Then, when the pseudo user virtual object 302 is completely drawn out of the small space 300 as illustrated in FIG. 12, the user 100 logs out from the virtual space 200. In one example, in a case where the virtual space 200 is a virtual space 200 relating to a game displayed by a game console or the like, the user 100 logs out and ends the game by performing the operation of drawing the pseudo user virtual object 302 out of the small space 300. Moreover, in the example described above, the user 100 logs out from the virtual space 200 by drawing completely the pseudo user virtual object 302 out of the small space 300. However, the user 100 can log out from the virtual space 200 by drawing a portion of the pseudo user virtual object 302 out of the small space 300. Such an operation method makes it possible for the user 100 to log out from the virtual space 200 more easily.

4. Processing Example of Operation Using Small Space in Virtual Space

Figure 13:
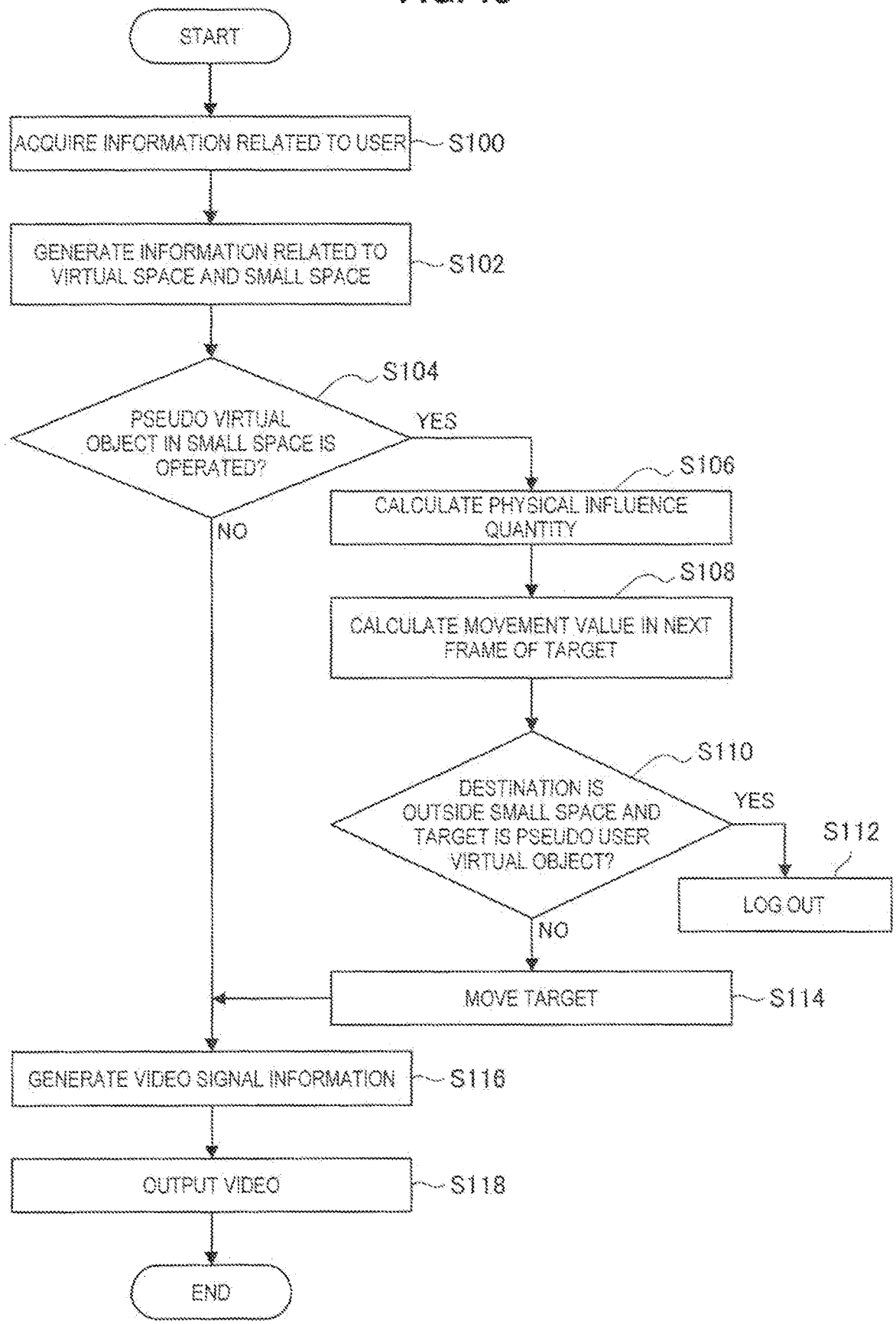
FIG. 13 is a flowchart illustrating an example of processing executed in an information processing apparatus according to an embodiment of the present disclosure.

The above description is given of the basic operation method using the small space 300 in the virtual space 200. The following description is given of the processing example of the operation using the small space 300 in the virtual space 200 as described above with reference to FIG. 13.

In S100, the user information detector 102 first acquires information related to the user 100, such as the motion, position, or the like of the user 100 in the real space. Then, in S102, the virtual space information generation unit 108 generates information related to the virtual space 200 on the basis of information from the user model generation unit 104, the storage unit 114, and the small space information generation unit 110. In addition, the small space information generation unit 110 generates information related to the small space 300 on the basis of the information from the virtual space information generation unit 108 and the storage unit 114.

Then, in S104, the operation information processing unit 112 determines whether or not the pseudo virtual object in the small space 300 is operated on the basis of the information from the user information detector 102 and the virtual space information generation unit 108. If the operation information processing unit 112 determines that the pseudo virtual object is not operated in S104, the processing proceeds to S116.

Then, in S116, the video signal generation unit 116 generates a video signal on the basis of the information generated by the virtual space information generation unit 108. Then, in S118, the video display unit 118 displays the video of the virtual space 200 on the basis of the video signal generated by the video signal generation unit 116.

In S104, if the operation information processing unit 112 determines that the pseudo virtual object is operated, the processing proceeds to S106. In S106, the operation information processing unit 112 calculates the physical influence quantity on the basis of the operation of the pseudo virtual object. Then, in S108, the operation information processing unit 112 calculates the movement amount of the pseudo virtual object that is an operation target and the movement amount of the virtual object corresponding to the operated pseudo virtual object.

Then, in S110, the operation information processing unit 112 determines whether or not the destination of the operation target is outside the small space 300 and whether or not the operation target is the pseudo user virtual object 302. In S110, if the operation information processing unit 112 determines that the destination of the operation target is outside the small space 300 and the operation target is the pseudo user virtual object 302, the processing proceeds to S112. Then, in S112, the user 100 logs out from the virtual space 200.

In S110, if the operation information processing unit 112 determines that the destination of the operation target is not outside the small space 300 or the operation target is not the pseudo user virtual object 302, the processing proceeds to S114. In S114, the operation information processing unit 112 sends the movement amount calculated in S108 to the virtual space information generation unit 108 and the small space information generation unit 110. Then, the virtual space information generation unit 108 and the small space information generation unit 110 generate information related to the virtual space 200 and the small space 300 after movement of the operation target on the basis of the received movement amount. Then, the processing proceeds to S116 and then S118, and the video display unit 118 displays the virtual space 200 after the movement of the operation target.

5. Other Methods of Operation Using Small Space

Figure 14:
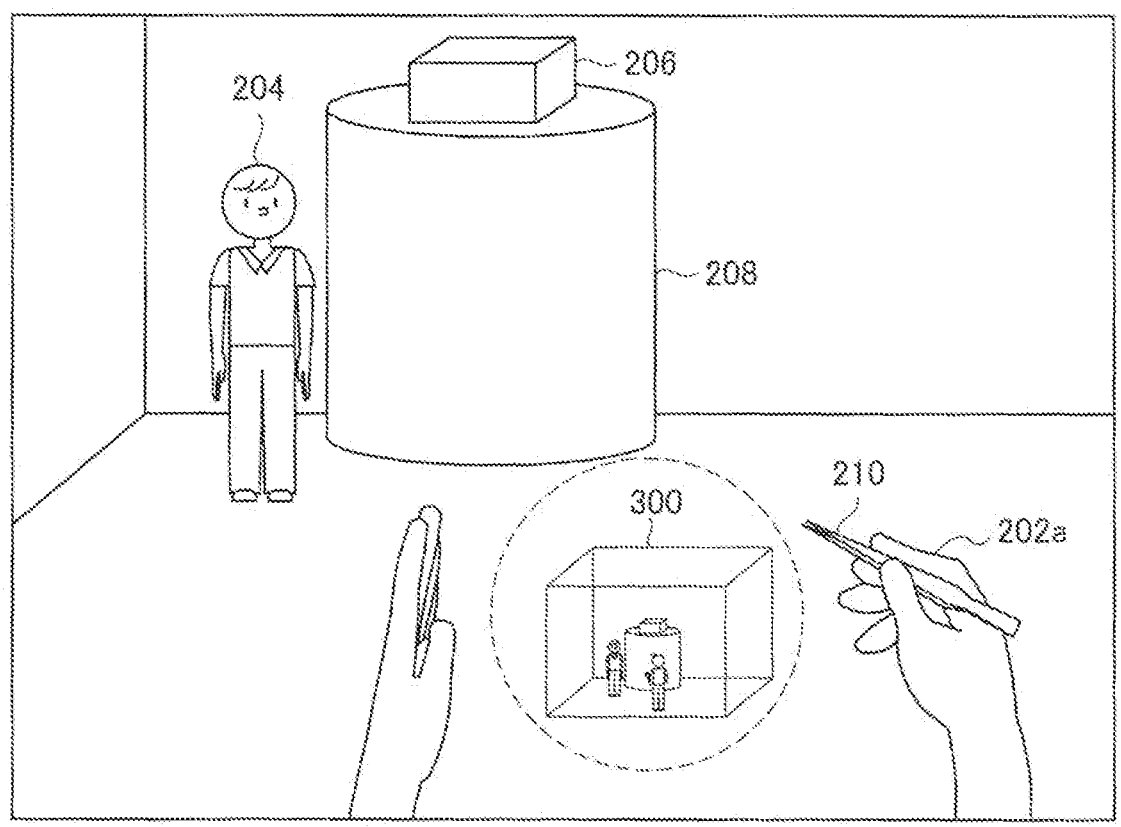
FIG. 14 is a diagram illustrating an operation performed on a small space using a tool according to an embodiment of the present disclosure.

The above description is given of the processing example of the operation using the small space 300 in the virtual space 200. The following description is given of other methods of operation in which the small space 300 is used. FIG. 14 is a diagram illustrating an example in which a pseudo virtual object in the small space 300 is operated using a tool.

As described above, the small space 300 can include a pseudo virtual object whose configuration of a virtual object or the like in the virtual space 200 is reduced. In this case, it is conceivable that the size of the pseudo virtual object included in the small space 300 is small and so it will be difficult for the user 100 to operate the pseudo virtual object.

Thus, the user 100 operates a pseudo virtual object in the small space 300 using a tool such as tweezers 210 as illustrated in FIG. 14. The operation of the pseudo virtual object using the tool in this manner makes it possible for the user 100 to operate the small-sized pseudo virtual object more accurately. Moreover, the tool can be selected using a tool bar displayed in the virtual space 200. In addition, the tweezers 210 are an example of the tool and not limited to this example. In one example, the tool can be a long needle, and so the user 100 can operate by piercing the pseudo virtual object with the needle.

Figure 15:
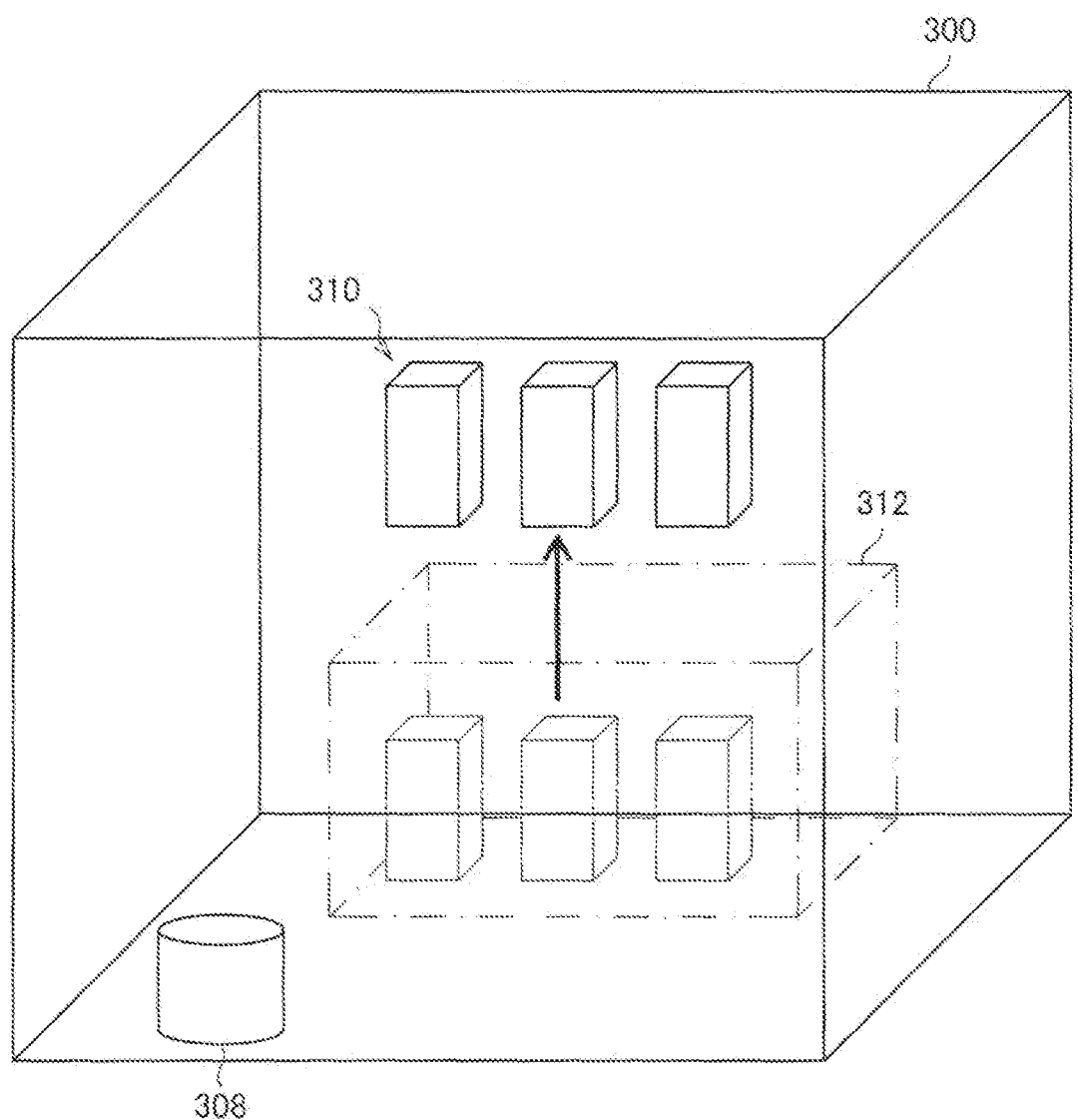
FIG. 15 is a diagram illustrating an example of an operation performed on a virtual object in a virtual space by a user using a small space according to an embodiment of the present disclosure.

Further, the user 100 can specify a region in the small space 300 and can operate the pseudo virtual objects included in the region together. FIG. 15 is a diagram illustrating this operation method in which the user 100 specifies a region 312 in the small space 300 through the user virtual object 202. Then, when the user 100 operates one of three pseudo virtual objects 310 included in the region 312 after specifying the region 312, the three pseudo thing virtual objects are operated.

In this event, the region 312 can be specified using the finger of the user virtual object 202. In one example, the region 312 can be specified by tracing the region 312 with the index finger of the user virtual object 202. In addition, the region 312 can be specified using the above-described tool. In addition, the display mode of a pseudo virtual object that is the operation target can be changed so that the user 100 can recognize that the pseudo virtual object is the operation target by specifying the region 312. In one example, the pseudo virtual object that is the operation target can change in color by specifying the region 312.

6. Method of Displaying Pseudo Virtual Object in Small Space

Figure 16:
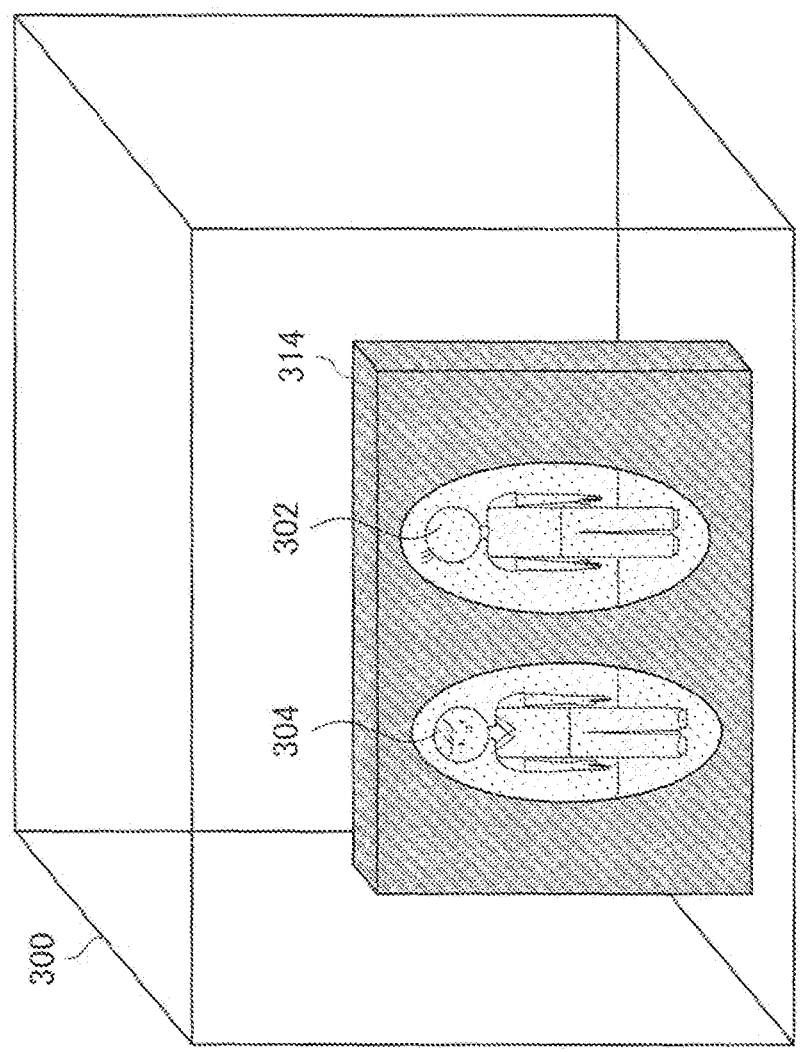
FIG. 16 is a diagram illustrating an example of a method of displaying a pseudo virtual object in a small space according to an embodiment of the present disclosure.

The above description is given of the various operation methods of the pseudo virtual object in the small spaces 300. The following description is given of another method of displaying the pseudo virtual object. FIG. 16 is a diagram illustrating an example in which the pseudo user virtual object 302 and the pseudo other person virtual object 304 are arranged behind a pseudo thing virtual object 314. In a case where a pseudo virtual object is arranged behind another pseudo virtual object in this manner, the user 100 fails to recognize existence of a pseudo virtual object arranged behind the pseudo thing virtual object 314. Thus, in the case where a pseudo virtual object is arranged behind another pseudo virtual object and the rearward pseudo virtual object is hidden as illustrated in FIG. 16, a portion of the forward pseudo virtual object can be displayed translucently as shown by an ellipse in FIG. 16. This allows the user 100 to recognize the existence of a hidden pseudo virtual object.

In the case where the hidden pseudo virtual object is an important pseudo virtual object, a portion of the pseudo virtual object can be displayed translucently as described above. In one example, in the case where the hidden pseudo virtual object is a pseudo virtual object that is operable by the user 100, a portion of the hidden pseudo virtual object can be displayed translucently. In addition, only in the case where the pseudo user virtual object 302 is hidden, a portion of the hidden pseudo virtual object can be displayed translucently.

The above description is given of the example in which a portion of the pseudo virtual object is displayed translucently. The following description is given of an example in which a pseudo virtual object corresponding to an inoperable virtual object is not displayed in the small space 300. FIG. 17 is a diagram illustrating an example in which the other person virtual object 204 and the thing virtual object 208 are inoperable and so a corresponding pseudo virtual object is not displayed in the small space 300. In this case, the pseudo user virtual object 302 and the pseudo thing virtual object 306 are displayed in the small space 300.

In this manner, the pseudo virtual object corresponding to the inoperable virtual object is not displayed in the small space 300, so the user 100 can easily recognize an operable virtual object. Moreover, the display mode of the pseudo virtual object corresponding to the inoperable virtual object can be changed as illustrated in FIG. 16. In other words, in the case where the operable virtual objects are the user virtual object 302 and the other person virtual object 304 in FIG. 16, another inoperable virtual object (the thing virtual object 314 in FIG. 16) can be displayed transparently to allow the user 100 to recognize easily an operable virtual object. In this event, even if the user 100 tries to operate the pseudo virtual object corresponding to the inoperable virtual object, the pseudo virtual object can be configured so that it fails to be operated, in one example, by allowing the arm the user virtual object 202 to pass through it.

Further, the operable pseudo virtual objects can be shown in various other ways. In one example, the operable pseudo virtual object can be indicated by periodic changes of all or part of the pseudo virtual objects. In addition, the operable pseudo virtual object can be indicated by periodically moving the shining ring from one end to the other end of the pseudo virtual object, or can be indicated by shining the entire pseudo virtual object periodically. In addition, the operable pseudo virtual object can be indicated in a manner that texture thereof varies. In other words, the operable pseudo virtual object can be displayed translucently, can be displayed with a polygon, can be displayed in the form of wire frame, or can be displayed with increased luminance.

Further, the operable pseudo virtual object can be indicated by changing the size of the pseudo virtual object. In other words, the operable pseudo virtual object can be indicated by enlarging or reducing the pseudo virtual object. In addition, the operable pseudo virtual object can be indicated by a change in the periphery of the pseudo virtual object. In other words, the operable pseudo virtual object can be indicated by giving an expression like a misty condition around the pseudo virtual object.

7. Method of Operation on Small Space

<7-1. Method of Operation of Changing Size of Small Space>

Figure 18:
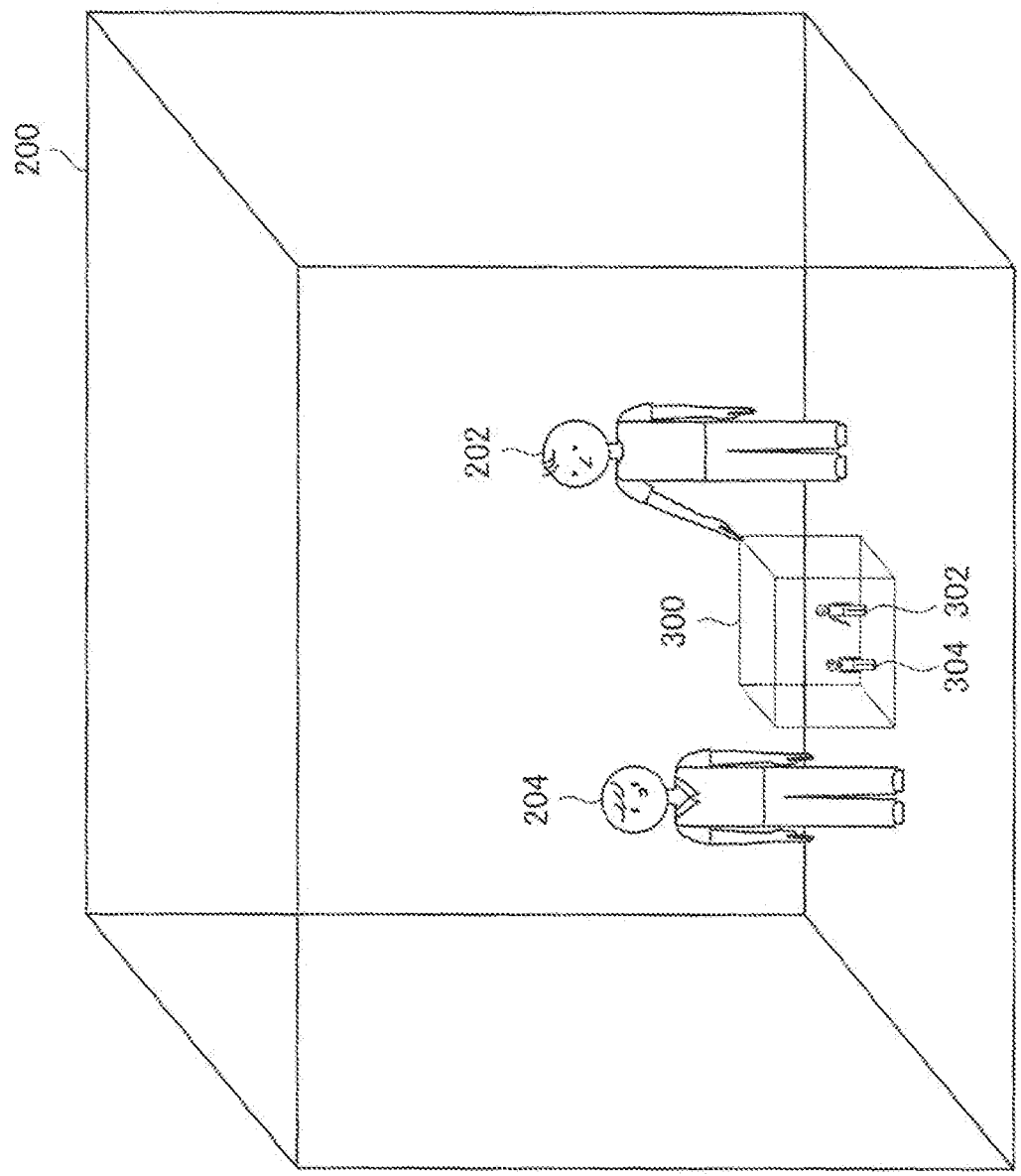
FIG. 18 is a diagram illustrating an example of an operation performed on a small space by a user using the small space according to an embodiment of the present disclosure.
Figure 19:
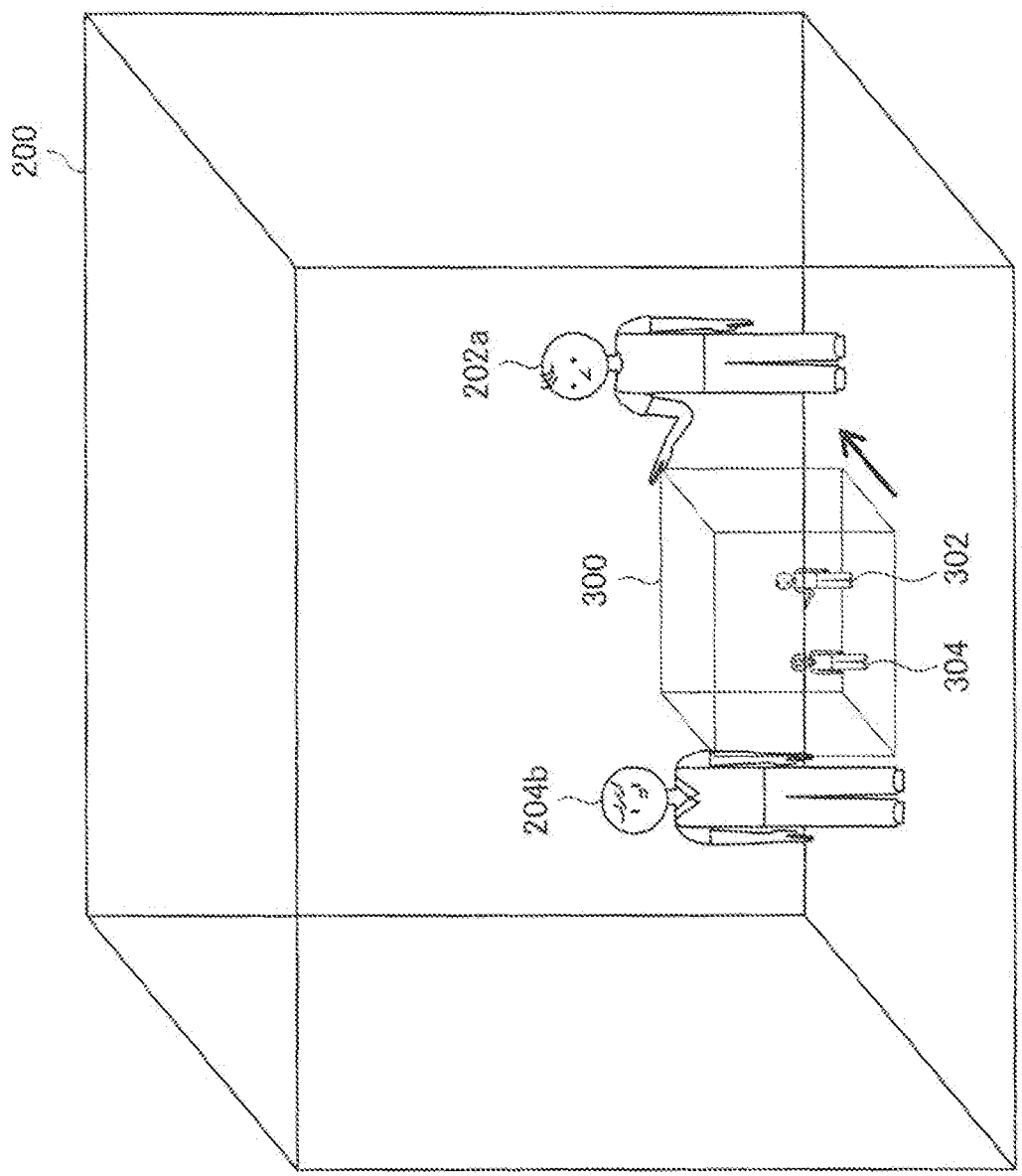
FIG. 19 is a diagram illustrating an example of an operation performed on a small space by a user using the small space according to an embodiment of the present disclosure.

The above description is given of the various operation methods of the pseudo virtual object in the small spaces 300. The following description is given of a method of operation on the small space 300. FIGS. 18 and 19 are diagrams illustrating an example of a method of an operation in which the user 100 performs an operation of changing the size of the small space 300 through the user virtual object 202.

As illustrated in FIG. 18, the user virtual object 202 first touches one edge of the small space 300 or holds one edge of the small space 300. Then, as illustrated in FIG. 19, the user virtual object 202 performs an action of pulling up one edge of the small space 300, so the size of the small space 300 can be increased. In this event, the size of the small space 300 increases and the scale in the small space 300 can also be changed with a change in the size of the small space 300.

In other words, the pseudo user virtual object 302 and the pseudo other person virtual object 304 in the small space 300 illustrated in FIG. 19 are respectively larger than the pseudo user virtual object 302 and the pseudo other person virtual object 304 in the small space 300 illustrated in FIG. 18. As will be appreciated, the user 100 can reduce the small space 300 in a similar manner of the operation. Such an operation method makes it possible for the user 100 to display the small space 300 on a scale corresponding to the configuration in the virtual space 200. In one example, in a case where many virtual objects exist in the virtual space 200, it is possible to operate easily the pseudo virtual object in the small space 300 by increasing the size of the small space 300.

Further, in the example described above, the scale in the small space 300 is changed with a change in the size of the small space 300. However, even in the case where the size of the small space 300 is changed, the scale in the small space 300 is not necessarily changed. In one example, in a case where the size of the small space 300 increases, the range displayed in the small space 300 can be widened without a change in the scale in the small space 300. Such an operation method makes it possible for the user 100 to perceive the configuration in the wider range of the virtual space 200.

Figure 20:
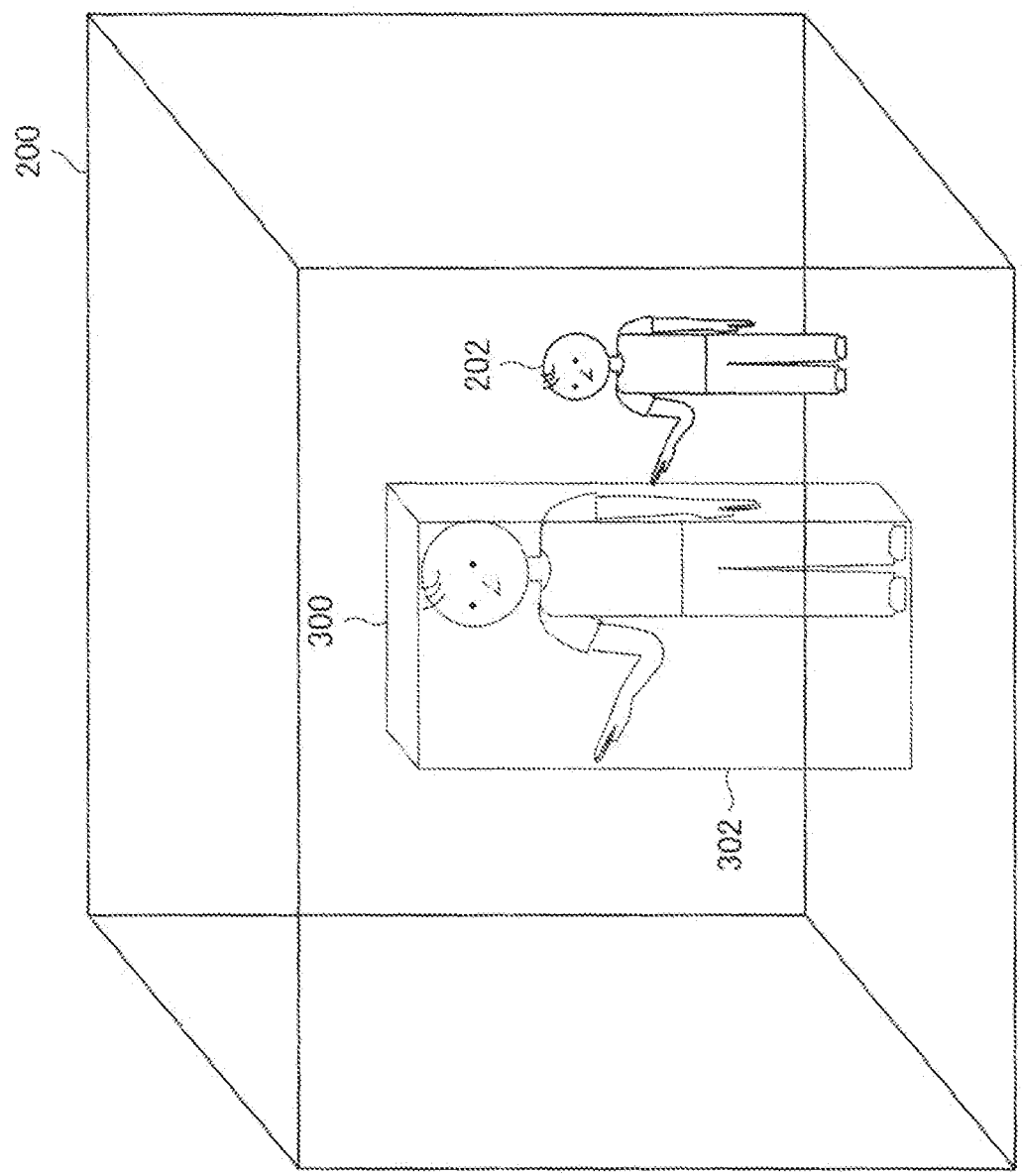
FIG. 20 is a diagram illustrating an example of an operation performed on a small space by a user using the small space according to an embodiment of the present disclosure.

Further, as illustrated in FIG. 20, the scale in the small space 300 can be larger than the scale in the virtual space 200 depending on a change in the size of the small space 300. In other words, as illustrated in FIG. 20, the pseudo user virtual object 302 in the small space 300 can be displayed larger than the user virtual object 202 in the virtual space 200. Such an operation method makes it possible for the user 100 to operate a portion of the virtual object in more detail. In one example, in the example of FIG. 20, the user 100 is able to operate a portion of the user virtual object 202, for example, clothes or the like, more finely and more accurately.

<7-2. Operation of Changing Scale in Small Space and Scroll Operation in Small Space>

Figure 21:
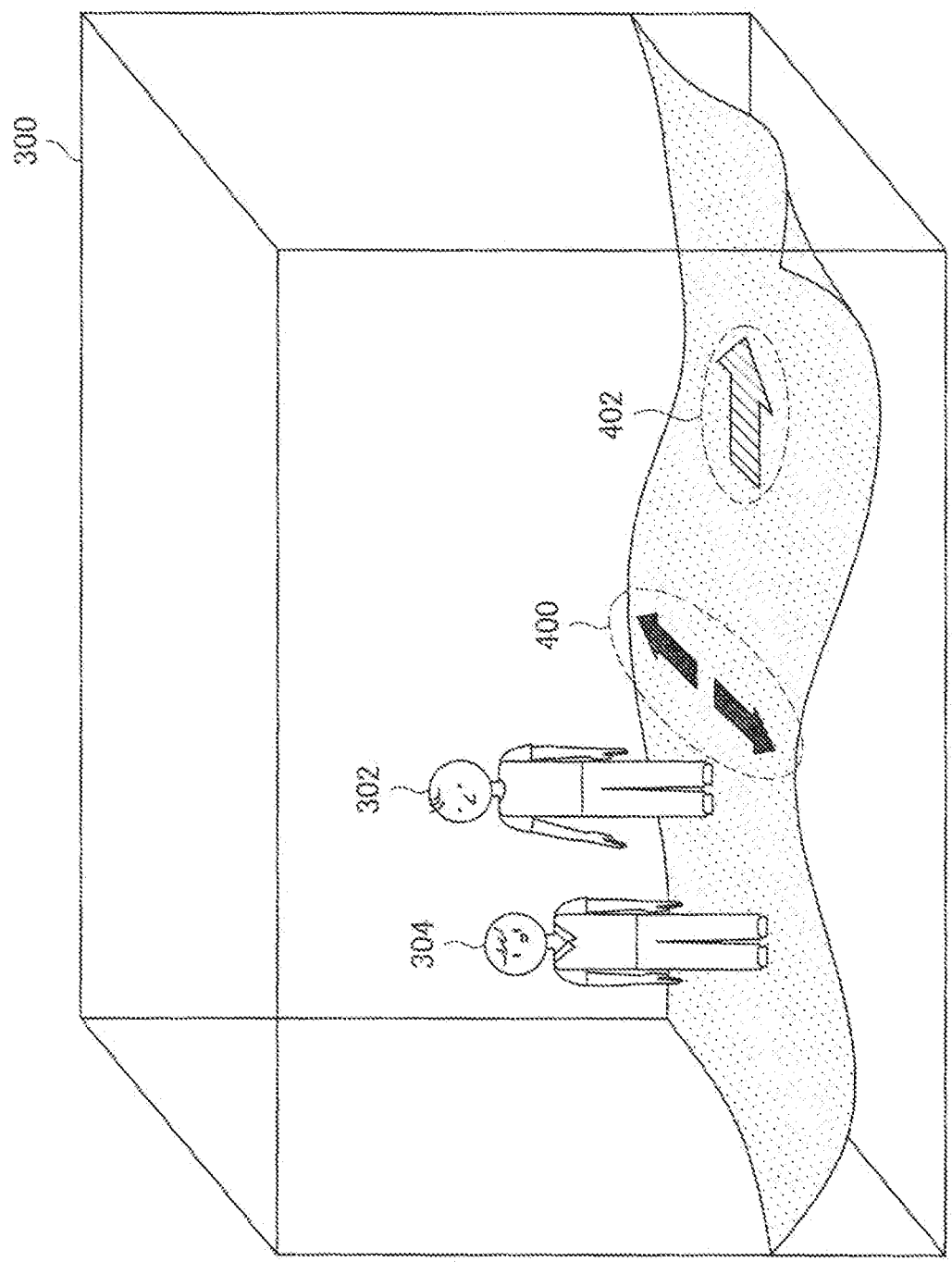
FIG. 21 is a diagram illustrating an example of an operation performed on a small space by a user using the small space according to an embodiment of the present disclosure.

The above description is given of the method of the operation of changing the size of the small space 300. The following description is given of an operation of changing the scale in the small space 300 and a scroll operation in the small space. As illustrated in FIG. 21, the user 100 performs a gesture like pinch-out as indicated by an arrow 400 through the user virtual object 202 in a predetermined area such as the ground or wall in the small space 300, so the scale in the small space 300 can be enlarged. In addition, the user 100 performs a gesture like scrolling as indicated by an arrow 402 through the user virtual object 202 in the predetermined area such as the ground or wall in the small space 300, so the display area in the small space 300 can be changed.

Figure 22:
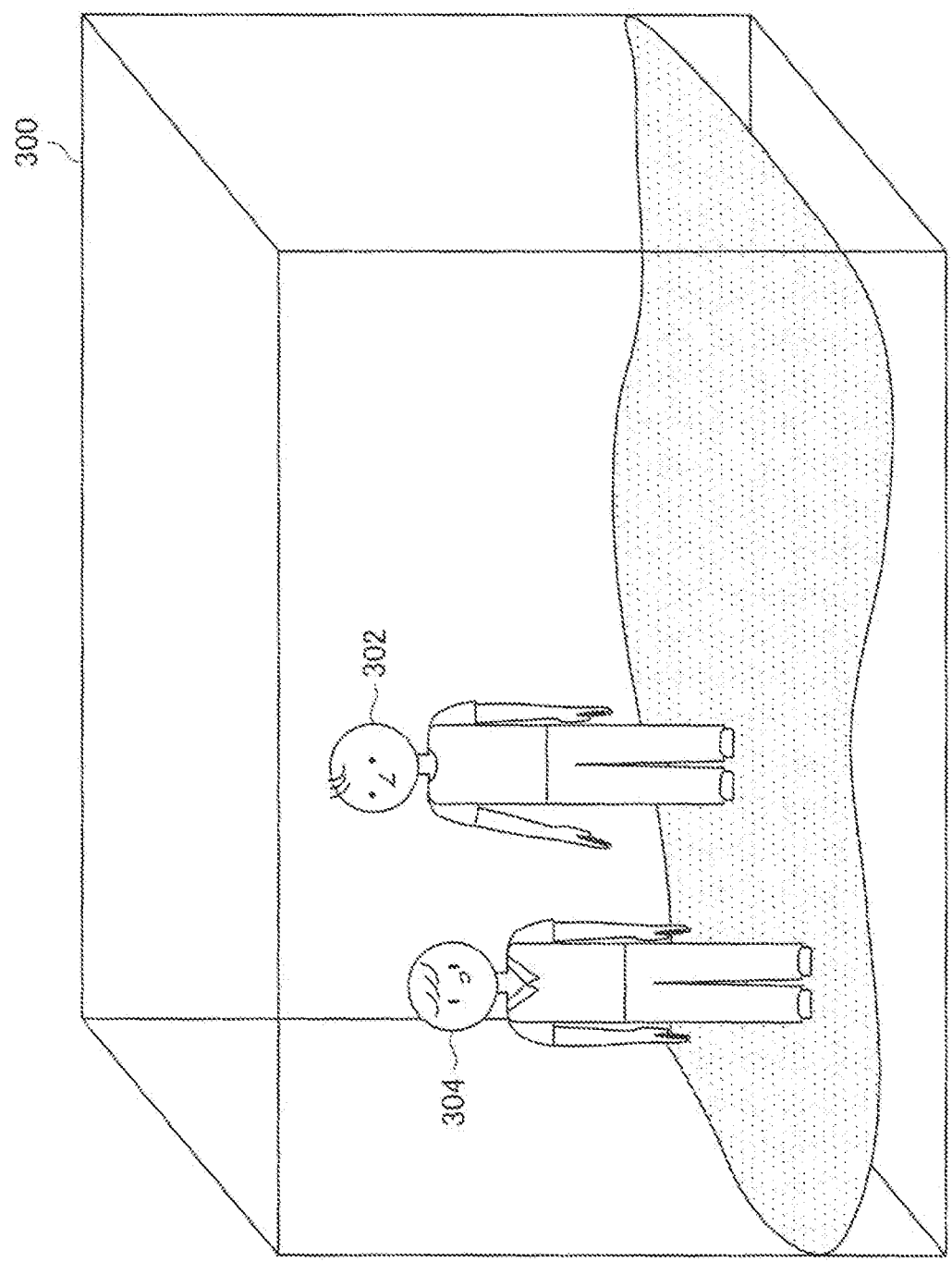
FIG. 22 is a diagram illustrating a small space after the operation performed on the small space in FIG. 21.

FIG. 22 is a diagram illustrating the state of the small space 300 after enlargement of the scale in the small space 300 by an operation like pinch-out indicated by the arrow 400 in FIG. 21. As can be appreciated from FIG. 22, the scale in the small space 300 of FIG. 22 is larger than the scale in the small space 300 of FIG. 21. Thus, the pseudo user virtual object 302 and the pseudo other person virtual object 304 in FIG. 22 are displayed respectively larger than the pseudo user virtual object 302 and the pseudo other person virtual object 304 in the small space 300 in FIG. 21.

Figure 23:
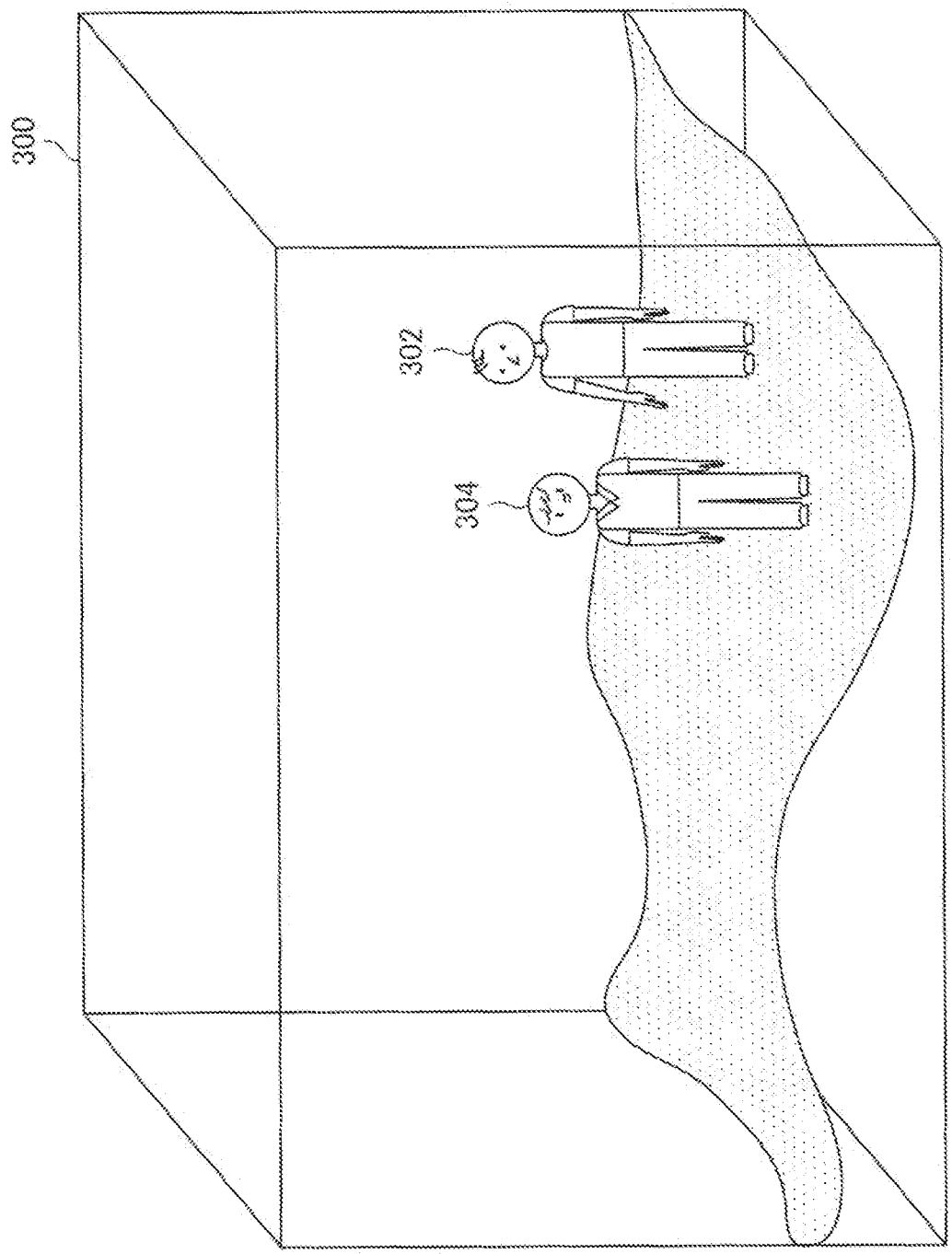
FIG. 23 is a diagram illustrating a small space after the operation performed on the small space in FIG. 21.

FIG. 23 is a diagram illustrating the state of the small space 300 after the change in the display area in the small space 300 by the operation like scrolling indicated by the arrow 402 in FIG. 21. As can be appreciated from FIG. 23, the scroll operation allows the pseudo user virtual object 302 and the pseudo other person virtual object 304 that existed at the left end of the small space 300 in FIG. 21 to be located at the right end of the small space 300 in FIG. 23. Moreover, in the case of such an operation, although the display mode in the small space 300 is changed, the size of the small space 300 in the virtual space 200 is not changed. Such an operation method makes it possible for the user 100 to change the scale in the small space 300 using the simple operation method and to change the display area of the small space 300.

Figure 24:
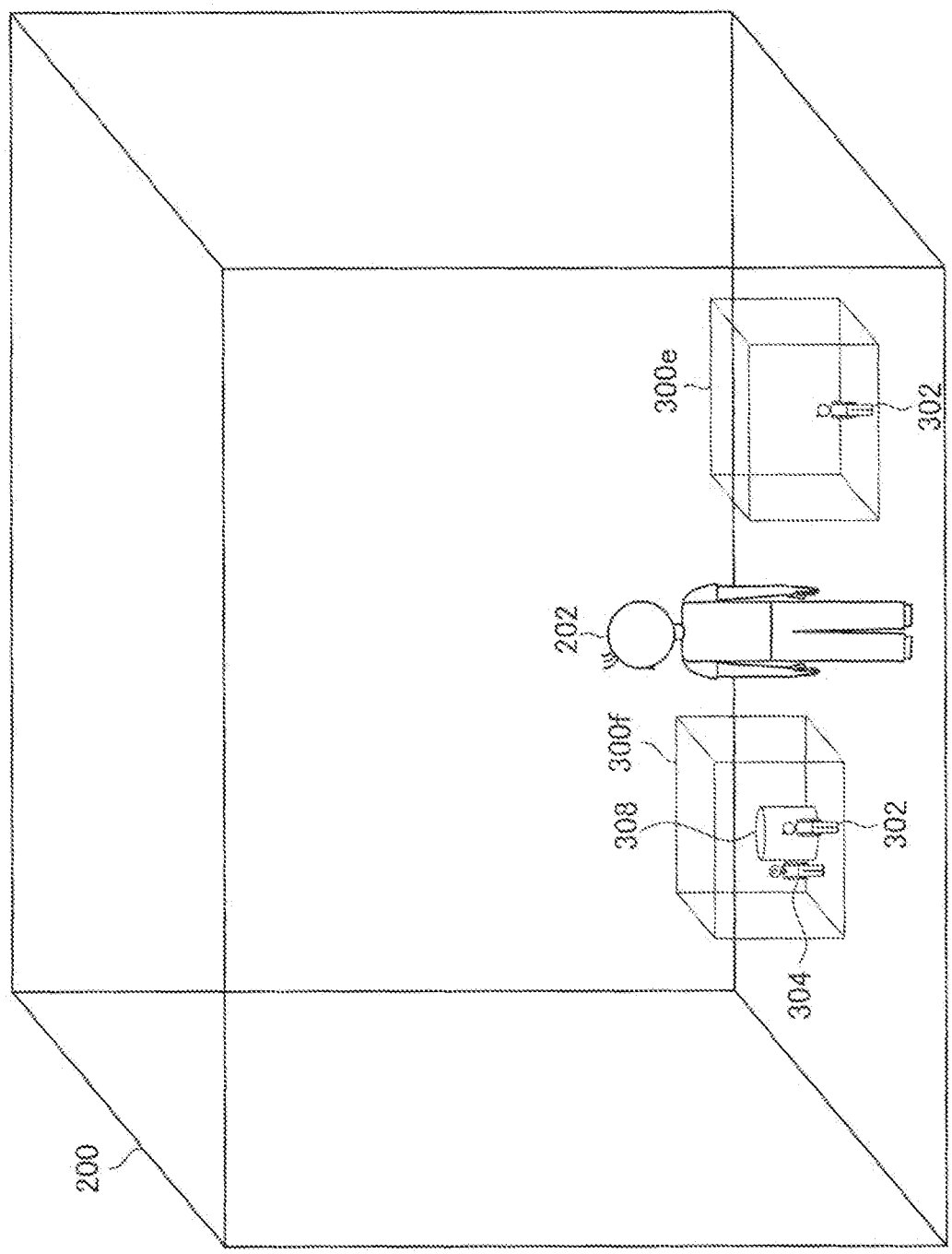
FIG. 24 is a diagram illustrating a virtual space having a plurality of small spaces arranged therein.

8. Method of Operation Using Small Space for Shifting to Virtual Space in Different Modes The above description is given of the method of operation on the small space 300. The following description is given of a method of an operation of shifting to the virtual space 200 in different modes using the small space 300. FIG. 24 is a diagram illustrating an example in which the virtual space 200 includes two small spaces 300e and 300f arranged in the virtual space 200. These two small spaces have different internal configurations in the small space 300.

The first small space 300e is the small space 300 obtained by copying the configuration in the virtual space 200 used currently and includes the pseudo user virtual object 302 corresponding to the user virtual object 202 in the virtual space 200. The second small space 300f is the small space 300 having a configuration different from that in the virtual space 200 used currently, and is based on information stored, in one example, in the storage unit 114. The second small space 300f includes a pseudo virtual objects corresponding to a virtual object that is not included in the virtual space 200 used currently, such as the pseudo other person virtual object 304 and the pseudo thing virtual object 308.

Figure 25:
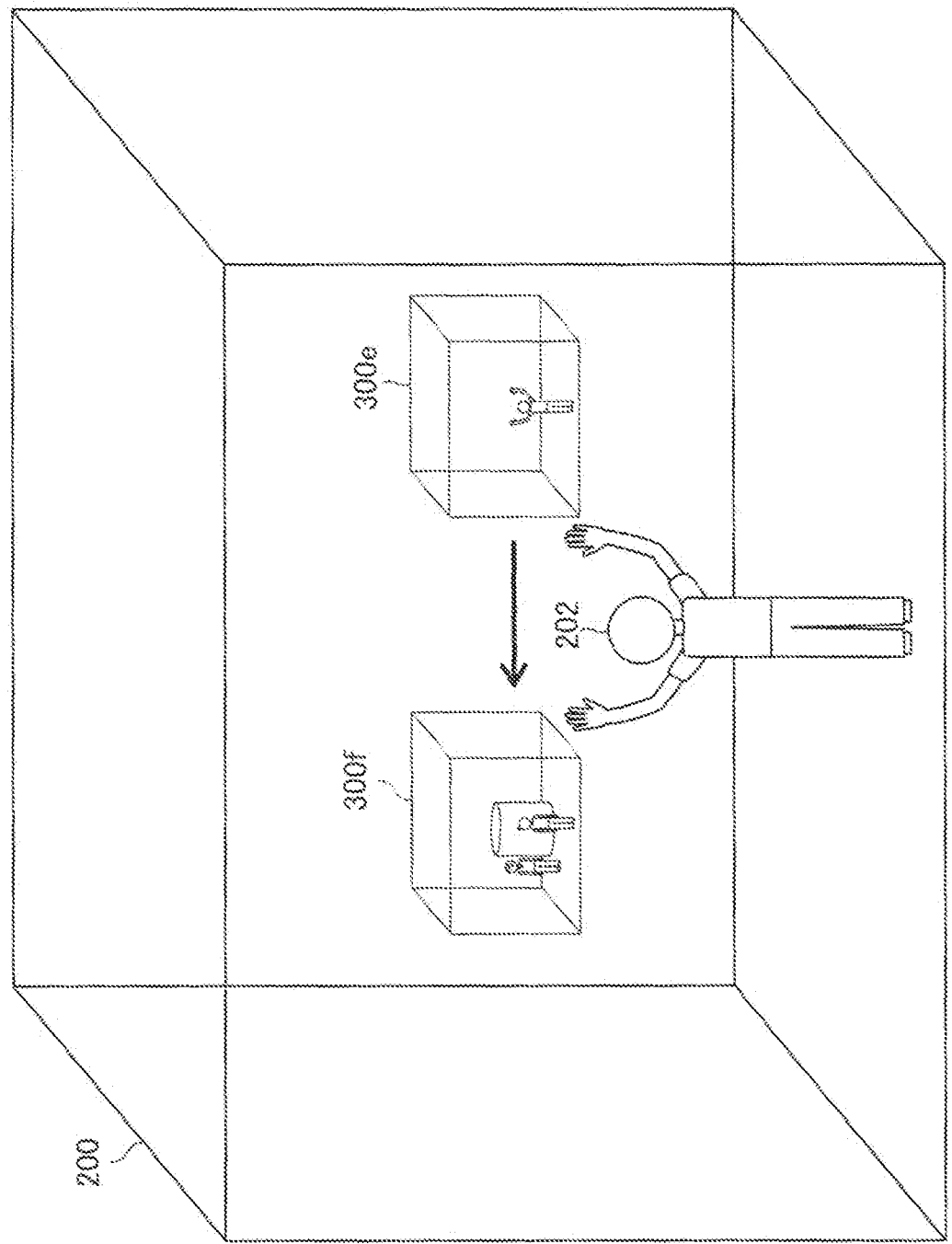
FIG. 25 is a diagram illustrating an example of an operation performed on a virtual space by a user using a small space according to an embodiment of the present disclosure.

Then, as illustrated in FIG. 25, the user 100 is able to make transition of the virtual space 200 to the state of the second small space 300f by performing an operation of bringing the first small space 300e into contact with the second small space 300f. Such an operation method makes it possible for the user 100 to make transition of the virtual space 200 so that it may include the configuration of the small space 300 including any configuration stored in the storage unit 114.

Moreover, information, which is stored in the storage unit 114, related to the second small space 300f can be information created in advance by the user 100. In one example, the user 100 can create the information related to the second small space 300f including any pseudo virtual object by the operation of the user 100. In addition, the information, which is stored in the storage unit 114, related to the second small space 300f can be information related to the state of the virtual space 200 used previously. In this case, the above-described operation performed by the user 100 allows the state of the virtual space 200 used previously to be read from the storage unit 114 and allows the virtual space 200 to be made transition to the previous state.

The user 100 can select the previous time point using a bar representing the time series displayed in the virtual space 200 as the method of selecting the previous time point. In addition, the user 100 can select the previous time point, in one example, by rotating the second small space 300f. In this event, in the second small space 300f, the previous state of the virtual space 200 can be reproduced in response to the rotation of the second small space 300f. In one example, the rotation of the second small space 300f allows the state of the virtual space 200 one hour ago to be reproduced in the second small space 300f. Similarly, the rotation of the second small space 300f allows the state of the virtual space 200 two hours ago to be reproduced in the second small space 300f.

Further, the state of the virtual space 200 can be continuously stored, periodically stored, or can be stored on the basis of a predetermined operation by the user 100, or can be stored on the basis of a specific event in the virtual space 200. Here, the specific event is, in one example, a case where the user virtual object 202 goes into a specific place in the virtual space 200 or a case where the user virtual object 202 touches a specific virtual object in the virtual space 200.

9. Method of Operation Using Small Space in Virtual Space Having Plural Hierarchies The above description is given of the method of operation using the small space 300 for shifting to the virtual space 200 in different modes. The following description is given of a method of operation using the small space 300 in the virtual space 200 having a plurality of hierarchies.

Figure 26:
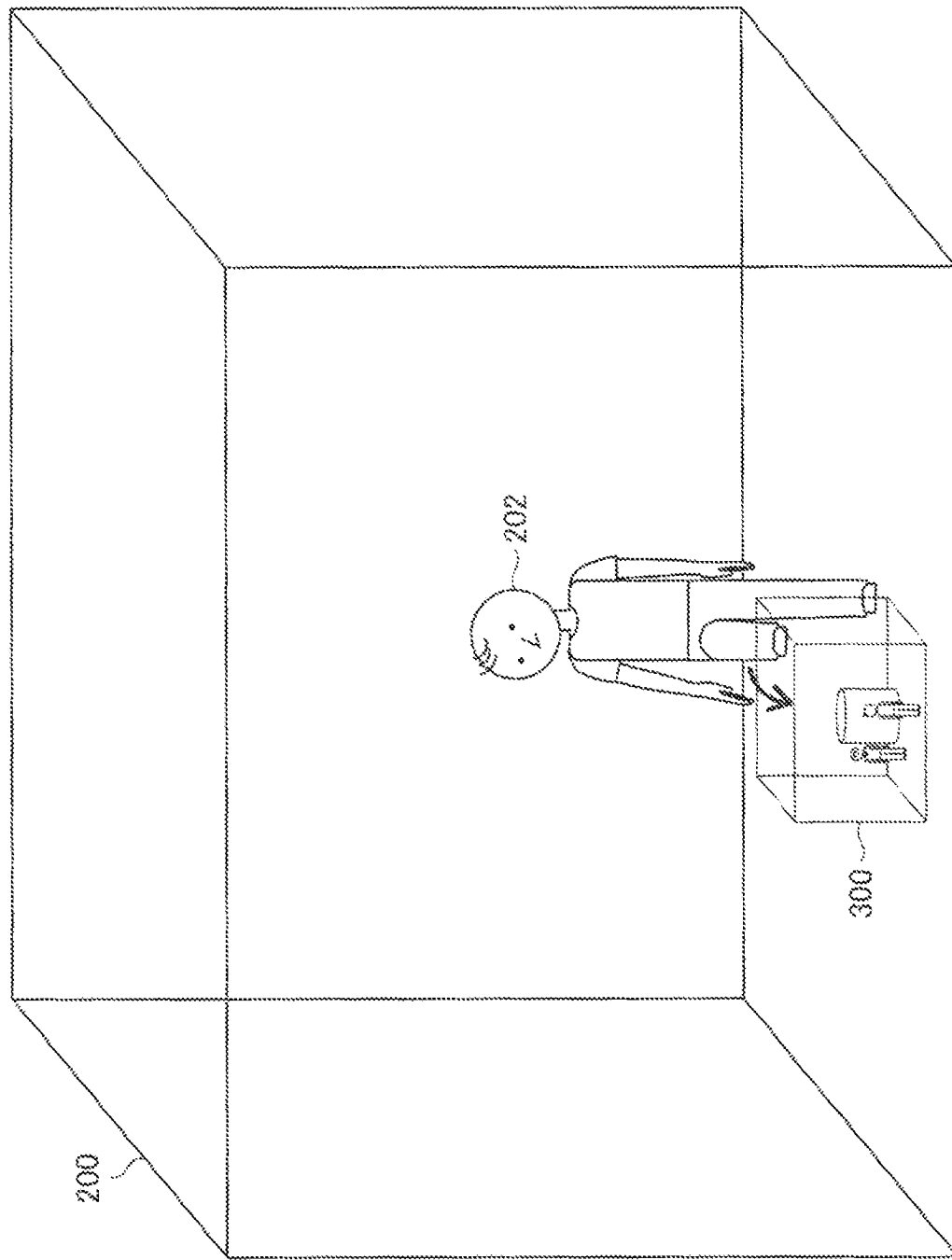
FIG. 26 is a diagram illustrating an example of an operation performed on a virtual space by a user using a small space according to an embodiment of the present disclosure.

The virtual space 200 can have a plurality of hierarchies, and the user 100 can perform an operation such that the user virtual object 202 goes into the small space 300 as illustrated in FIG. 26. Such an operation by the user 100 allows the virtual space 200 can be made transition to the virtual space 200 of a different hierarchy.

Figure 27:
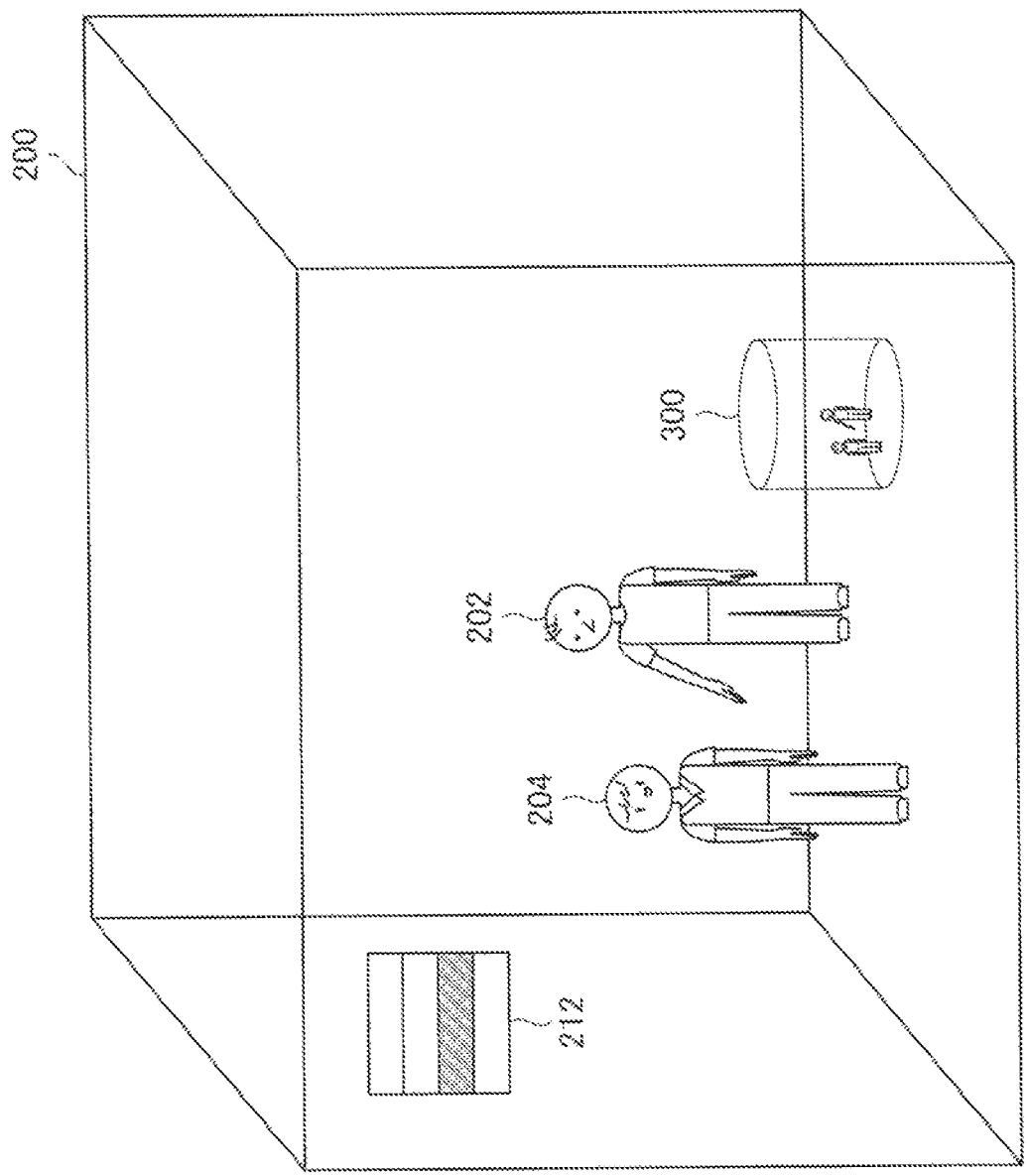
FIG. 27 is a diagram illustrating an example of a hierarchical display that is displayed in a virtual space according to an embodiment of the present disclosure.

FIG. 27 is a diagram illustrating an example in the case where the user virtual object 202 exists in the virtual space 200 of the third hierarchy. When the user 100 goes into the virtual space 200, it is difficult to recognize a hierarchy of the virtual space 200. Thus, as illustrated in FIG. 27, a hierarchical display 212 indicating the current hierarchy of the virtual space 200 can be displayed in the virtual space 200. In addition, the display state of the small space 300 to be displayed can be changed depending on the hierarchy of the virtual space 200. In one example, the small space 300 can be displayed as a cube in the case of the first hierarchy, the small space 300 can be displayed as a triangular pyramid in the case of the second hierarchy, and the small space 300 can be displayed as a cylinder in the case of the third hierarchy. Such a configuration makes it possible for the user 100 to recognize easily a hierarchy of the virtual space 200 used currently.

10. Method of Operation for Deleting and Displaying Small Space

The above description is given of the method of the operation using the small space 300 in the virtual space 200 having a plurality of hierarches. The following description is given of a method of an operation for deleting the small space 300 and an operation for displaying the small space 300.

Figure 28:
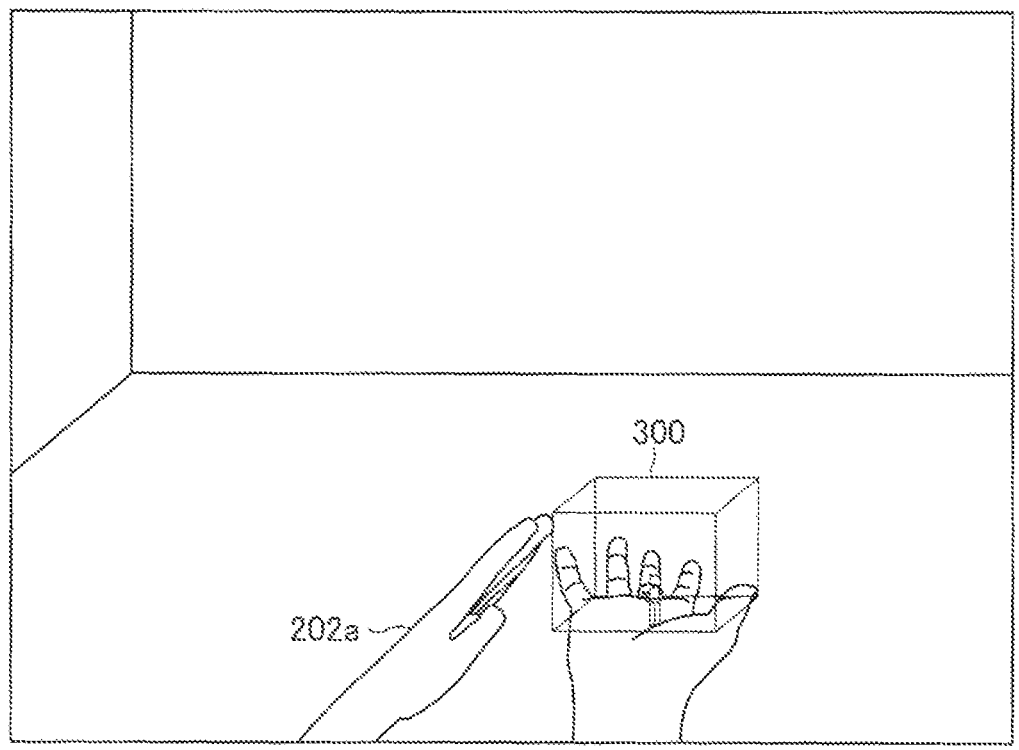
FIG. 28 is a diagram illustrating an example of a method of displaying a small space according to an embodiment of the present disclosure.

As described above, the method of the operation using the small space 300 is useful for the operation of the virtual object in the virtual space 200. However, the small space 300 can become an obstacle, so the small space 300 can be temporarily deleted from the virtual space 200. In one example, as illustrated in FIG. 28, the small space 300 can be deleted by placing the small space 300 on the palm of the user virtual object 202 and performing an operation by the user 100 of sweeping off it with the other arm of the user virtual object 202. In addition, the small space 300 can be deleted by allowing the user 100 to perform an operation of directing the palm downward from the state in which the small space 300 is placed on the palm of the user virtual object 202. In addition, the small space 300 can be deleted by allowing the user 100 to perform an operation of stepping on the small space 300 with the foot of the user virtual object 202.

Moreover, the deleted small space 300 can be displayed again by the operation of the user 100, and there are various operation methods therefor. In one example, the small space 300 can be displayed by allowing the user 100 to perform an operation of directing the palm of the user virtual object 202 upward.

Figure 29:
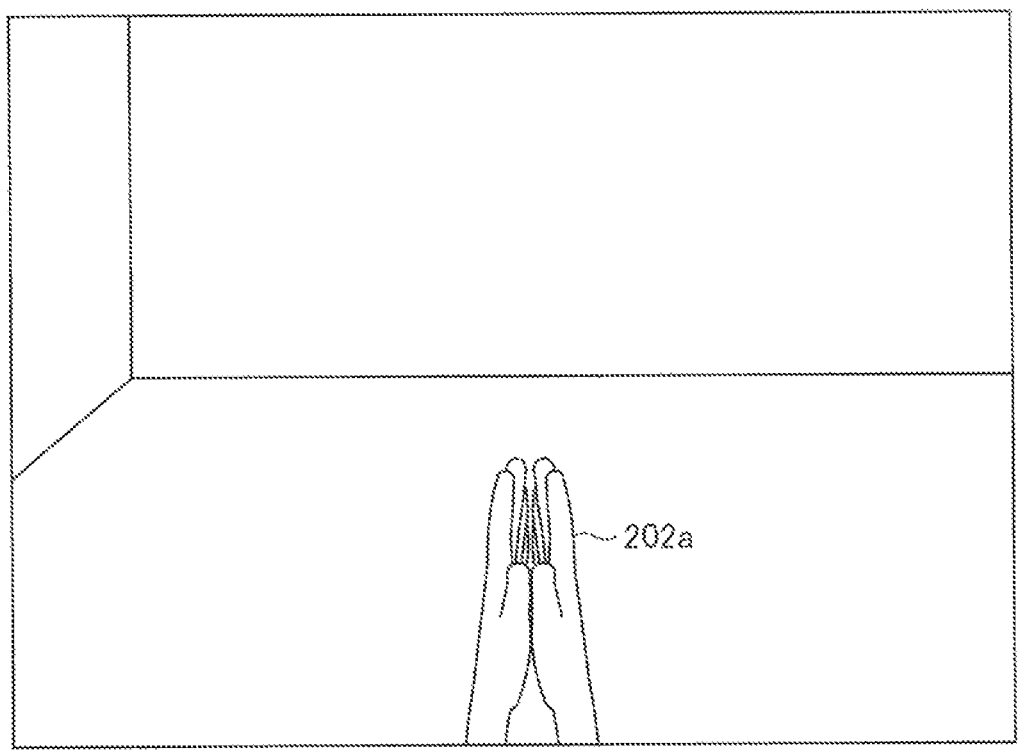
FIG. 29 is a diagram illustrating an example of a method of displaying a small space according to an embodiment of the present disclosure.
Figure 30:
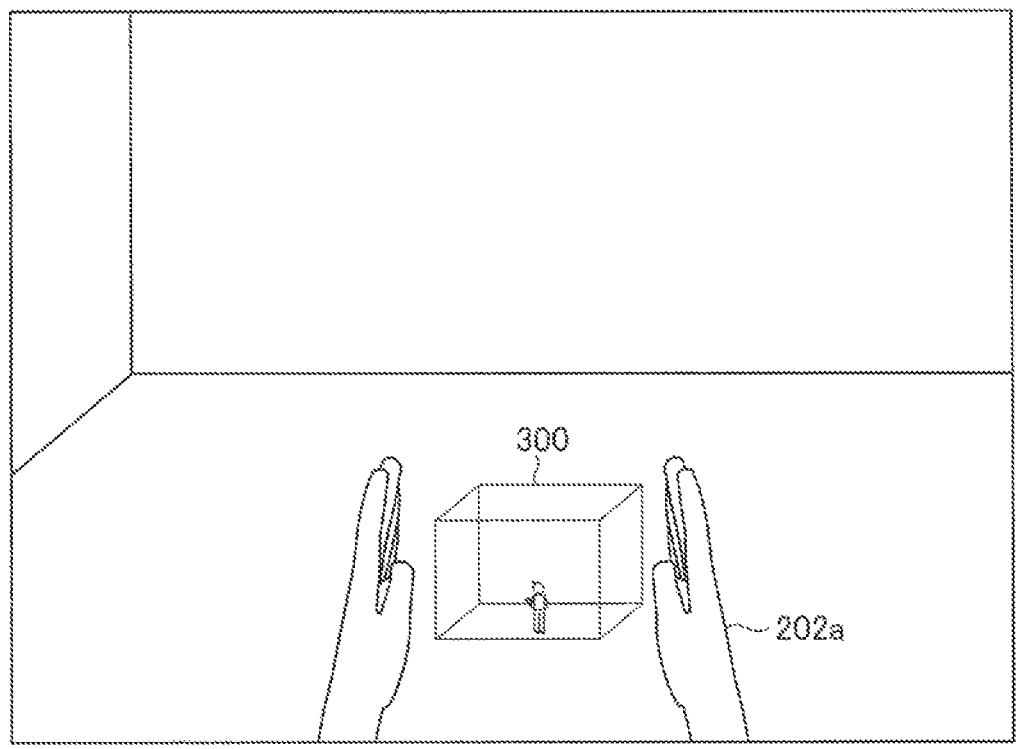
FIG. 30 is a diagram illustrating an example of a method of displaying a small space according to an embodiment of the present disclosure.

Further, as illustrated in FIGS. 29 and 30, the small space 300 can be displayed by allowing the user 100 to perform an operation of folding the hand of the user virtual object 202 and then opening the hand of the user virtual object 202.

Such a configuration makes it possible for the user 100 to delete easily the small space 300 in the case where the small space 300 is an obstacle in the virtual space 200. In addition, it is possible for the user 100 to display easily the small space 300 when the user 100 performs the operation using the small space 300 after deletion of the small space 300.

11. Example of Application to Augmented Reality Space (AR Space)

The above description is given of the operation method in which the small space 300 is used in the virtual space 200. The following description is given of an example in which the above-described operation method using the small space 300 is applied to the AR.

The AR space is a virtual space in which information is added to the real environment through a transparent display or the like or is a virtual space in which information is deleted from the real environment. In one example, an AR space to which furniture or the like, which is not in the real space, is added to an image of the room in the real space acquired through an imaging device or the like can be presented to the user 100 through a display device.

The method of the operation using the small space 300 provided in the present disclosure is applied to the operation method in the AR space, so the user 100 is able to operate easily the virtual object in the AR space. Furthermore, the user 100 is able to operate an object in the real space corresponding to the virtual object in the AR space by operating the virtual object in the AR space using the small space 300 in the AR space.

In one example, when there is a lighting fixture in the real space and there is a virtual object corresponding to the lighting fixture in the AR space, the user 100 can operate the lighting fixture in the real space by operating a pseudo virtual object corresponding to the lighting fixture in the small space 300. In one example, in a case where the user 100 performs an operation of turning on the switch for the pseudo virtual object corresponding to the lighting fixture in the small space 300, the switch of the lighting fixture in the real space can be turned on. Such an operation makes it possible for the user 100 to operate easily an object at a position distant from the user 100 in the real space.

Further, as can be appreciated, the user 100 is able to operate on information added to the AR space using the small space 300 although it does not exist in the real space. In one example, in a case where a sofa, which does not exist in the real space, is added to the AR space and the AR space is displayed, the user 100 can operate the added sofa using the small space 300. Such an operation makes it possible for the user 100 to operate easily an object, which does not exist in the real space, in the AR space.

12. Supplement

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In one example, the description provided above with reference to the example of FIG. 24 is given of the example in which a plurality of small spaces 300 having different configurations are arranged in the virtual space 200. However, a plurality of small spaces 300 having the same configuration can be arranged in the virtual space 200. In one example, the user 100 can rotate one small space 300 and so perceive the configuration of the virtual space 200 used currently from an angle different from another small space 300. Such a configuration makes it possible for the user 100 is able to perceive the state of the virtual space 200 used currently simultaneously from different angles. In addition, the user 100 can bring a plurality of small spaces 300 into contact with each other, thereby moving the pseudo virtual object into another small space 300 via the contacted surface. Such an operation makes it possible for the user 100 to move easily the pseudo virtual object in the small space 300 from end to end.

Further, the description provided above with reference to the example of FIG. 9 is given of the method of the operation of drawing the pseudo virtual object out of the small space 300. However, conversely, an operation of putting the virtual object in the virtual space 200 into the small space 300 can be performed. This operation method makes it possible for the user 100 to place easily the virtual object at hand to a far place in the virtual space 200.

Further, FIGS. 27 and 28 illustrate the example in which the virtual space 200 has a plurality of hierarchies. In this event, an example of presenting the hierarchy of the virtual space 200 to the user 100 by displaying a hierarchical display of the virtual space 200 in the virtual space 200 is illustrated. However, re-immersion into a predetermined hierarchy or higher can be prohibited to prevent excessive immersion into the virtual space 200.

Further, a computer program for causing the virtual space information generation unit 108, the small space information generation unit 110, and the operation information processing unit 112 to operate as described above can be provided. In addition, a storage medium in which such a program is stored can be provided.

13. Concluding Remarks

As described above, the information processing apparatus provided in the present disclosure enables the user 100 to operate easily the virtual object in the virtual space 200 using the small space 300 including the pseudo virtual object. Accordingly, the user 100 is able to easily place the virtual object in the virtual space 200 far away or place it at hand of the user virtual object 202. In addition, the user 100 is able to operate the user virtual object 202 in the virtual space 200 by operating the pseudo user virtual object 302 in the small space 300. This makes it possible for the user 100 to move the user virtual object 202 far away in the virtual space 200 and to log out from the virtual space 200.

Further, the information processing apparatus according to the embodiment of the present disclosure allows the pseudo virtual object corresponding to the inoperable virtual object to be displayed in different modes. In addition, the pseudo virtual object corresponding to the inoperable virtual object is not necessarily displayed. Such a configuration makes it possible for the user 100 to recognize easily an operable virtual object in the virtual space 200.

Further, the information processing apparatus according to the embodiment of the present disclosure allows the pseudo virtual object in the small space 300 to be operated using a tool. Such a configuration makes it possible for the user 100 to operate easily a small-sized pseudo virtual object in the small space 300.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:

a first space information generation unit configured to generate information related to a first space including a first object;

a second space information generation unit configured to generate information related to a second space such that the second space is arranged in the first space, the second space being smaller than the first space and including the first object in the first space; and an operation information processing unit configured to process information regarding an operation on the first space on the basis of an operation on the second space by a user.

(2)

The information processing apparatus according to (1), in which the first space is a virtual space.

(3)

The information processing apparatus according to (2), in which the first space information generation unit generates the information related to the first space such that a first object is included in the first space, and the second space information generation unit generates the information related to the second space such that a second object corresponding to the first object in the first space is included in the second space.

(4)

The information processing apparatus according to (3), in which the first object moves in response to motion of the second object by the operation of the user.

(5)

The information processing apparatus according to (3) or (4), in which the operation on the second space by the user includes moving the second object in the second space to an outside of the second space.

(6)

The information processing apparatus according to any one of (3) to (5), in which the operation on the second space by the user includes moving the first object in the first space into the second space.

(7)

The information processing apparatus according to any one of (3) to (6), in which the operation on the second space by the user includes operating the second object of the user in the second space.

(8)

The information processing apparatus according to (3), in which the operation on the second space by the user includes moving the second object of the user in the second space to an outside of the second space, and the user logs out from the virtual space when the second object of the user in the second space is moved to an outside of the second space.

(9)

The information processing apparatus according to any one of (2) to (8), in which the second space information generation unit generates the information related to the second space such that a size of the second space is changed in response to the operation of the user.

(10)

The information processing apparatus according to any one of (2) to (9), in which the second space information generation unit generates the information related to the second space such that a scale in the second space is changed in response to the operation of the user.

(11)

The information processing apparatus according to any one of (2) to (10), in which the second space information generation unit generates the information related to the second space such that a plurality of the second spaces are arranged in the first space.

(12)

The information processing apparatus according to any one of (2) to (11), further including:

a storage unit configured to store a state of the first space, in which the second space information generation unit generates the information related to the second space in which the state of the first space stored in the storage unit is reproduced.

(13)

The information processing apparatus according to (12), in which the first space information generation unit generates the information related to the first space in which the state of the first space stored in the storage unit is reproduced on the basis of a specific operation performed by the user on the second space in which the state of the first space stored in the storage unit is reproduced.

(14)

The information processing apparatus according to (13), in which a plurality of the second spaces are arranged in the first space, and the specific operation performed by the user on the second space in which the state of the first space stored in the storage unit is reproduced is an operation of bring one of the plurality of second spaces into contact with another of the plurality of second spaces by the user.

(15)

The information processing apparatus according to any one of (2) to (14), in which the second space information generation unit generates the information related to the second space such that display for distinguishing the first space from the second space is performed on the second space or on a periphery of the second space.

(16)

The information processing apparatus according to any one of (3) to (15), in which the second space information generation unit generates the information related to the second space such that a portion of the second object in the second space is displayed in a display mode different from a display mode of another object in the second object.

(17)

The information processing apparatus according to (16), in which the second space information generation unit generates the information related to the second space such that the first object inoperable by the user in the first space is prevented from being displayed in the second space.

(18)

The information processing apparatus according to any one of (2) to (17), in which the operation on the second space by the user is performed using a specific tool.

(19)

A method including:

generating, by a first space information generation unit, information related to a first space;

generating, by a second space information generation unit, information related to a second space such that the second space is arranged in the first space, the second space being smaller than the first space; and processing, by an operation information processing unit, information regarding an operation on the first space by allowing a user to perform an operation on the second space, in which the second space is arranged in the first space.

(20)

A computer program for causing a first space information generation unit to generate information related to a first space, causing a second space information generation unit to generate information related to a second space such that the second space is arranged in the first space, the second space being smaller than the first space, and causing an operation information processing unit to process information regarding an operation on the first space on the basis of an operation on the second space by a user.

REFERENCE SIGNS LIST 100 user
102 user information detector
104 user model generation unit
106 user viewpoint detector
108 virtual space information generation unit
110 small space information generation unit
112 operation information processing unit
114 storage unit
116 video signal generation unit
118 video display unit
200 virtual space
202 user virtual object
204 other person virtual object
206, 208 thing virtual object
300 small space
302 pseudo user virtual object
304 pseudo other person virtual object
306, 308 pseudo thing virtual object

The invention claimed is:

1. An information processing apparatus, comprising:
a first space information generation unit configured to generate information related to a first space, wherein the first space includes a first object;
a second space information generation unit configured to generate information related to a second space, wherein
the second space is in the first space, and
the second space is smaller than the first space;
an operation information processing unit configured to process information regarding a specific operation on the first space, wherein the information regarding the specific operation on the first space is processed based on a user operation by a user on the second space; and
a display device configured to restrict display of the first object in the second space based on:
the information related to the second space,
the first object being inoperable by the user in the first space, and
presence of the inoperable first object in the first space.

2. The information processing apparatus according to claim 1, wherein the first space is a virtual space.

3. The information processing apparatus according to claim 2, wherein
the first space includes a third object,
the second space includes a second object corresponding to the third object, and
the generated information related to the first space is associated with the second object in the second space.

4. The information processing apparatus according to claim 3, wherein
movement of the second object in the first space is based on motion of the second object in the second space, and the motion of the second object is based on the user operation.

5. The information processing apparatus according to claim 3, wherein the user operation on the second space includes movement of the second object from the second space to an outside of the second space.

6. The information processing apparatus according to claim 3, wherein the user operation on the second space includes operation on the second object in the second space.

7. The information processing apparatus according to claim 3, wherein
the user operation on the second space includes movement of the second object from the second space to an outside of the second space,
the user logs out from the virtual space based on the movement of the second object from the second space to the outside of the second space.

8. The information processing apparatus according to claim 3, wherein the display device is further configured to display a portion of the second object in the second space in a display mode different from a display mode of the third object.

9. The information processing apparatus according to claim 2, wherein
the information related to the second space indicates a change in a size of the second space, and
the change in the size of the second space is based on the user operation.

10. The information processing apparatus according to claim 2, wherein
the information related to the second space indicates a change of a scale in the second space, and
the change of the scale in the second space is based on the user operation.

11. The information processing apparatus according to claim 2, wherein the information related to the second space indicates that a plurality of second spaces is in the first space.

12. The information processing apparatus according to claim 2, further comprising a storage unit configured to store information indicating a state of the first space, wherein the second space reproduces the state of the first space.

13. The information processing apparatus according to claim 12, wherein the first space reproduces the state based on the user operation on the second space.

14. The information processing apparatus according to claim 13, wherein
the first space includes a plurality of subspaces, and
a first subspace of the plurality of subspaces is in contact with a second subspace of the plurality of subspaces based on the user operation.

15. The information processing apparatus according to claim 2, wherein the display device is further configured to control a display of one of the second space or a periphery of the second space to distinguish the first space from the second space.

16. The information processing apparatus according to claim 2, wherein the user operation on the second space is by a specific tool.

17. A method, comprising:
generating, by a first space information generation unit, information related to a first space, wherein the first space includes an object;
generating, by a second space information generation unit, information related to a second space, wherein
the second space is in the first space, and
the second space is smaller than the first space;
processing, by an operation information processing unit, information regarding a specific operation on the first space, wherein the information regarding the specific operation on the first space is processed based on a user operation by a user on the second space; and
restricting, by a display device, display of the object in the second space based on:
the information related to the second space,
the object being inoperable by the user in the first space, and
presence of the inoperable object in the first space.

18. A non-transitory computer-readable medium having stored thereon, computer-executable instructions which, when executed by a computer, cause the computer to execute operations, the operations comprising:
controlling a first space information generation unit to generate information related to a first space, wherein the first space includes an object;
controlling a second space information generation unit to generate information related to a second space, wherein
the second space is in the first space, and
the second space is smaller than the first space;
controlling an operation information processing unit to process information regarding a specific operation on the first space, wherein the information regarding the specific operation on the first space is processed based on a user operation by a user on the second space; and
controlling a display device to restrict display of the object in the second space based on:
the information related to the second space,
the object being inoperable by the user in the first space, and
presence of the inoperable object in the first space.

* * * * *